(12) United States Patent
Yoshimi et al.

(10) Patent No.: US 6,923,713 B2
(45) Date of Patent: Aug. 2, 2005

(54) CYLINDRICAL GRINDER, AND MECHANISM FOR PRODUCING RELATIVE MOVEMENT BETWEEN GRINDING WHEEL AND WORKPIECE IN CYLINDRICAL GRINDER

(75) Inventors: Takayuki Yoshimi, Toyohashi (JP); Nobumitsu Hori, Ichinomiya (JP); Hiromichi Ota, Kariya (JP); Yasuo Niino, Hoi-gun (JP); Satoshi Okubo, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/980,159

(22) Filed: Nov. 4, 2004

(65) Prior Publication Data

US 2005/0064800 A1     Mar. 24, 2005

Related U.S. Application Data

(62) Division of application No. 10/387,464, filed on Mar. 14, 2003.

(30) Foreign Application Priority Data

Mar. 29, 2002  (JP) ............................. 2002-095005
Mar. 29, 2002  (JP) ............................. 2002-095007
Mar. 29, 2002  (JP) ............................. 2002-095008

(51) Int. Cl.$^7$ ............................................. B24B 7/00
(52) U.S. Cl. ..................... 451/236; 451/124; 451/137; 451/213; 451/405; 451/393
(58) Field of Search ................... 451/119, 124, 127, 451/137, 139, 150, 213, 215, 236, 387, 393, 451/405

(56) References Cited

U.S. PATENT DOCUMENTS

| | | | | | |
|---|---|---|---|---|---|
| 3,867,792 A | * | 2/1975 | Pelletier | ...................... | 451/123 |
| 3,953,942 A | * | 5/1976 | Nisimura | ..................... | 451/123 |
| 4,019,286 A | * | 4/1977 | Spooner et al. | ............. | 451/422 |
| 4,121,384 A | * | 10/1978 | Harmant | ...................... | 451/151 |
| 4,679,356 A | * | 7/1987 | Thomas | ...................... | 451/558 |
| 5,265,381 A | * | 11/1993 | Takahashi | ..................... | 451/41 |
| 5,301,473 A | * | 4/1994 | Seear | .......................... | 451/367 |

FOREIGN PATENT DOCUMENTS

JP    55-120962    9/1980

* cited by examiner

*Primary Examiner*—Eileen P. Morgan
(74) *Attorney, Agent, or Firm*—Oblon, Spivak, McClelland, Maier & Neustadt, P.C.

(57) ABSTRACT

A cylindrical grinder includes a workpiece support section adapted to support a generally cylindrical workpiece and rotate the workpiece about a rotational axis, and a wheel head adapted to support and rotate a grinding wheel. The wheel head is moved relative to the workpiece support section, along a first direction parallel to a rotational axis of the workpiece and along a second direction perpendicular to the first direction in order to grind an outer surface of the workpiece. The wheel head is turnable relative to the workpiece so that a rotational axis of the grinding wheel can be tilted within a plane substantially passing through the rotational axis of the grinding wheel and the rotational axis of the workpiece, within a range extending across a reference plane perpendicular to the rotational axis of the workpiece. Further, link-type parallel link mechanisms for moving the grinding wheel are disclosed.

10 Claims, 18 Drawing Sheets

PRIOR ART

PRIOR ART

CYLINDRICAL GRINDER, AND MECHANISM FOR PRODUCING RELATIVE MOVEMENT BETWEEN GRINDING WHEEL AND WORKPIECE IN CYLINDRICAL GRINDER

INCORPORATION BY REFERENCE

The present application claims priority under 35 U.S.C. .sctn.119 to Japanese Patent Application Nos. 2002-95005, 2002-95007 and 2002-95008, filed on Mar. 29, 2002, respectively. The content of this application is incorporated herein by reference in its entirety.

BACKGROUND OF THE INVENTION

1. Field of the Invention

The present invention relates to a cylindrical grinder, and more particularly to a cylindrical grinder which includes a workpiece support section for supporting and rotating a workpiece, and a wheel head for supporting and rotating a grinding wheel, and which grinds an outer surface of the workpiece through movement of the wheel head relative to the workpiece along a direction parallel to the axis of the workpiece and along a radial direction of the workpiece.

The present invention also relates to a mechanism for producing relative movement between a grinding wheel and a workpiece in a cylindrical grinder of the above-described type.

2. Description of the Related Art

As shown in FIG. 1, a cylindrical grinder 100 includes a workpiece support section 110 for supporting and rotating a workpiece W, and a wheel head 120 for supporting and rotating a grinding wheel T. In the cylindrical grinder 100, the wheel head 120 is moved relative to the workpiece W, which is supported on the workpiece support section 110, along a direction parallel to the rotational axis Ws of the workpiece (Z-axis direction) and along a radial direction of the workpiece (X-axis direction), in order to grind an outer surface of the workpiece W. Notably, in general, the wheel head 120 is disposed in such a manner that the rotational axis Ws of the workpiece W becomes parallel to the rotational axis Ts of the grinding wheel T.

In the cylindrical grinder 100, circumferential surfaces and end surfaces of the workpiece W are ground by means of circumferential and end surfaces of the grinding wheel T, which assumes a disc-like shape. In such a grinder, grinding burn is prone to occur when an end surface of the grinding wheel T comes into contact with an end surface of the workpiece W over a wide area. In order to obviate such a drawback, conventionally, grinding of end surfaces has been performed at lowered machining efficiency, or a so-called angular-slide grinding as shown in FIG. 2 has been employed. In the angular-slide grinding, the rotational axis Ts of the grinding wheel T is slightly tilted relative to the rotational axis Ws of the workpiece W within a plane passing through these axes Ts and Ws; and circumferential and end surfaces of the workpiece W are ground by means of a corner portion of the tilted grinding wheel T.

However, when angular-slide grinding is performed by use of the conventional cylindrical grinder 100, only one of the opposite end surfaces of the workpiece W (only the right-hand end surface in the example shown in FIG. 2) can be ground, and therefore, the workpiece W must be turned through 180° in a horizontal plane (hereinafter referred to as "inversion operation") before grinding of the other end surface. Such turning of the workpiece W increases the number of steps required for grinding the opposite end surfaces of the workpiece W.

Another conceivable arrangement for a cylindrical grinder is such that one grinding wheel is provided on each of the opposite sides of a wheel head, which is rotatably supported in order to tilt the rotational axes of the grinding wheels relative to the rotational axis of a workpiece within a plane passing through these axes. This arrangement enables grinding of opposite end surfaces of the workpiece without involvement of the above-described inversion operation. However, in this case, since a grinding wheel is provided on each of the opposite sides of the wheel head, the size of the wheel head increases, and the grinding wheel that is not used for on-going grinding may interfere with the workpiece or the workpiece support section. Therefore, when a grinding wheel is provided on each of the opposite sides of the wheel head, limitations are imposed on shapes of workpieces which can be ground, thereby impairing the versatility of the cylindrical grinder.

SUMMARY OF THE INVENTION

In view of the foregoing, an object of the present invention is to provide a cylindrical grinder which can grind opposite end surfaces of a workpiece without inverting the workpiece and which can employ a grinding wheel of reduced diameter.

Another object of the present invention is to provide a parallel link mechanism for a cylindrical grinder which can displace a movable body, such as a grinding wheel, at high speed and with high accuracy.

According to a first aspect of the present invention, there is provided a cylindrical grinder which comprises a workpiece support section adapted to support a generally cylindrical workpiece and rotate the workpiece about a rotational axis, and a wheel head adapted to support and rotate a grinding wheel. The wheel head is moved relative to the workpiece support section, along a first direction parallel to the rotational axis of the workpiece and along a second direction perpendicular to the first direction in order to grind an outer surface of the workpiece. The wheel head is turnable relative to the workpiece so that a rotational axis of the grinding wheel can be tilted within a plane substantially passing through the rotational axis of the grinding wheel and the rotational axis of the workpiece, within a range extending across a reference plane perpendicular to the rotational axis of the workpiece.

In a cylindrical grinder, a direction along which a supported workpiece extends can be set freely. Therefore, in the present invention, the plane within which the rotational axis of the grinding wheel is tilted is defined as substantially passing through the rotational axis of the grinding wheel and the rotational axis of the workpiece. More specifically, when a workpiece is supported in such a manner that its rotational axis extends along a left-right direction of a bed, the rotational axis of the grinding wheel is tilted leftward or rightward from the reference plane perpendicular to the rotational axis of the workpiece. When a workpiece is supported in such a manner that its rotational axis extends along a front-back direction of the bed, the rotational axis of the grinding wheel is tilted frontward or backward from the reference plane. When a workpiece is supported in such a manner that its rotational axis extends along a vertical direction (up-down direction), the rotational axis of the grinding wheel is tilted upward or downward from the reference plane.

In general, a cylindrical grinder is configured to support a workpiece in such a manner that the rotational axis of the workpiece extends along a left-right direction of a bed, and to grind the workpiece by use of a grinding wheel disposed on the back side of the workpiece. Therefore, in the following description, a workpiece is assumed to be supported to extend along the left-right direction, and the terms "left-right direction" and "front-back direction" will be used in relation to relative movement between a grinding wheel and a workpiece. However, these expressions regarding directions should not be construed to limit the present invention. In embodiments in which a workpiece is supported in such a manner that its rotational axis extends along a front-back direction or a vertical direction, the directions used in the following description must be replaced with corresponding directions when the following description is applied to these embodiments.

In the cylindrical grinder according to the present invention, when the wheel head is located at a center position, the rotational axis of the grinding wheel is located within the reference plane perpendicular to the workpiece (hereinafter simply referred to as a "reference plane"); i.e., the rotational axis of the grinding wheel perpendicularly intersects the rotational axis of the workpiece, and a front face (an outer, circular side surface opposite the wheel head) of the grinding wheel faces the workpiece. When the wheel head is turned clockwise from the center position to a position at which the rotational axis of the grinding wheel is tilted leftward with respect to the reference plane, a right-hand portion of the grinding wheel as viewed from the front face is located on the front side with respect to the center of the grinding wheel, and a left-hand portion of the grinding wheel as viewed from the front face is located on the rear side with respect to the center of the grinding wheel. In this state, a circumferential surface and a left-hand end surface of the workpiece are ground by use of the right-hand portion of the grinding wheel as viewed from the front face. By contrast, when the wheel head is turned counterclockwise from the center position to a position at which the rotational axis of the grinding wheel is tilted rightward with respect to the reference plane, a left-hand portion of the grinding wheel as viewed from the front face is located on the front side with respect to the center of the grinding wheel, and a right-hand portion of the grinding wheel as viewed from the front face is located on the rear side with respect to the center of the grinding wheel. In this state, a circumferential surface and a right-hand end surface of the workpiece are ground by use of the left-hand portion of the grinding wheel as viewed from the front face. As described above, in the cylindrical grinder according to the present invention, circumferential surfaces and left-hand and right-hand end surfaces can be ground through a simple operation of turning the wheel head.

The state in which a rear end portion of the wheel head opposite the grinding wheel is located rearward relative to a front end portion thereof adjacent to the grinding wheel is maintained until the rotational axis of the grinding wheel becomes parallel to the rotational axis of the workpiece upon turning of the wheel head. In this state, the wheel head hardly interferes with the workpiece or a workpiece supporting structure on the workpiece support section. Therefore, a grinding wheel of small diameter can be used.

In the present invention, no limitation is imposed on the mechanism for moving the wheel head relative to the workpiece, so long as the mechanism can move the wheel head relative to the workpiece along a first direction parallel to the rotational axis of the workpiece (hereinafter referred to as the "Z-axis direction") and along a second direction perpendicular to the first direction (hereinafter referred to as the "X-axis direction"). Therefore, the cylindrical grinder according to the present invention may have a structure such that a workpiece support section is disposed on a bed to be movable along the Z-axis direction, and a wheel head is disposed on the bed to be movable along the X-axis direction; a structure such that the workpiece support section is fixedly disposed on the bed, and the wheel head is disposed on the bed to be movable along the Z-axis direction and the X-axis direction; or a structure such that the wheel head is fixedly disposed on the bed, and the workpiece support section is disposed on the bed to be movable along the Z-axis direction and the X-axis direction.

Further, example structures for enabling the wheel head to be turned relative to the workpiece include a structure such that the wheel head is disposed on the bed in a turnable manner and a structure such that the workpiece support section is disposed on the bed in a turnable manner.

Preferably, the grinding wheel has a plurality of tapered circumferential surfaces serving as grinding faces and having different inclination angles relative to the rotational axis of the grinding wheel. In this case, during grinding operation, the grinding wheel is tilted in such a manner that a selected tapered circumferential surface of the grinding wheel becomes substantially parallel to a circumferential surface or an end surface of the workpiece to be ground. More preferably, at least one of the tapered circumferential surfaces is formed of a grinding stone different from those of the remaining tapered circumferential surfaces. This configuration enables a selected workpiece surface to be ground by use of a circumferential surface formed of a grinding stone suitable for the selected surface; e.g., suitable for a desired type of finishing.

According to a second aspect of the present invention, there is provided a parallel link mechanism for producing relative movement between a grinding wheel and a workpiece in a cylindrical grinder, comprising: a movable body supporting one of the grinding wheel and the workpiece, the movable body being disposed on a base (e.g., a bed) of the cylindrical grinder to be translatable along a first axis and rotatable about a second axis perpendicular to the first axis; and at least two operation rods pivotably connected to a pivot portion of the movable body, the operation rods moving the pivot portion in order to translate and rotate the movable body relative to the base.

In the parallel link mechanism, when the operation rods are operated, the operation rods move the pivot portion of the movable body to thereby translate and/or rotate the movable body. Therefore, even in the case where an intermediate member is disposed between the base and the movable body in order to support the movable body in a rotatable or translatable manner, the intermediate member is not required to have a drive unit for translating or rotating the movable body. Therefore, the weights of the intermediate member and the movable member each decrease by an amount corresponding to the weight of a drive unit, thereby enabling the movable body to be displaced at high speed.

Further, the movable body is supported to be translatable relative to the base along a single axis. In other words, translation of the movable body is restricted to translation along the single axis, irrespective of the manner in which the pivot portion of the movable body is moved by means of the operation rods. Therefore, when a sufficiently high degree of accuracy is secured for translation along the single axis, the movable body can be translated with high straightness, and thus can be displaced accurately.

Preferably, the parallel link mechanism further comprises two drive blocks disposed on the base and moved straight, the operation rods being pivotally connected to the respective drive blocks. In this case, the operation rods are moved by means of the drive blocks moved straight. Since the movement of each drive block is a single straight motion, accurate control of the movement distance of the drive block is easy. Therefore, the plurality of operation rods can be operated simultaneously with high accuracy, whereby the movable body can be displaced more accurately.

The drive blocks may be moved along a direction parallel to the direction of translation of the movable body. In this case, when the drive blocks corresponding to the respective operation rods are moved simultaneously by equal distances, the movable body is translated by a distance equal to the movement distances of the drive blocks. Therefore, the movement distance of the movable body can be determined directly from the movement distances of the drive blocks, thereby facilitating control of the movement distance of the movable body.

When the movement stroke of the movable body is to be increased, the movement strokes of the drive blocks are increased; i.e., the size of the parallel link mechanism as measured along a direction perpendicular to the movement direction of the movable body is not required to change. Therefore, the movement stroke of the movable body can be increased while the size of the parallel link mechanism as measured along the direction perpendicular to the movement direction of the movable body is maintained small.

Alternatively, the drive blocks may be moved along a direction perpendicular to the direction of translation of the movable body. In this case, even when the movement stroke of the movable body is increased through an increase in the movement stroke of each drive block, the size of the parallel link mechanism as measured along the movement direction of the movable body does not increase; instead, the size of the parallel link mechanism as measured along the direction perpendicular to the movement direction of the movable body increases. Therefore, the movement stroke of the movable body can be increased while the size of the parallel link mechanism as measured along the movement direction of the movable body is maintained small.

The operation rods may be pivotally connected to the base and configured to be extendable and contractable. In this case, the operation rods may be extended or contracted or rotated relative to the base in order to move the pivot portion of the movable body. The extension and contraction motion is a single straight motion, and the rotation motion is a single circular motion. Therefore, accurate control of operation of each operation rod is easy, and thus, the plurality of operation rods can be operated simultaneously with high accuracy, whereby the movable body can be displaced more accurately.

Moreover, in this arrangement, first ends of the operation rods are pivotably connected to the movable body, and second ends of the operation rods are pivotably connected to the base; and the operation rods are extended or contracted or rotated relative to the base in order to move the pivot portion of the movable body. Therefore, drive blocks for moving the second ends of the operation rods are not required, and rails or other members for movably supporting the drive blocks are not required.

According to a third aspect of the present invention, there is provided a parallel link mechanism for producing relative movement between a grinding wheel and a workpiece in a cylindrical grinder, comprising: a movable body movably disposed on a base of the cylindrical grinder and supporting one of the grinding wheel and the workpiece; at least three drive blocks each moved straight relative to the base; and at least three operation rods, first ends of the operation rods being pivotably connected to the movable body via at least two pivot portions, and second ends of the operation rods being pivotably connected to the corresponding drive blocks, wherein the movable member is translated or rotated, on a plane, relative to the base upon transmission of movements of the drive blocks to the movable body via the operation rods and the pivot portions.

In the parallel link mechanism, when the operation rods are operated, the operation rods move the pivot portions of the movable body to thereby translate and/or rotate the movable body. Therefore, even in the case where an intermediate member is disposed between the base and the movable body in order to support the movable body in a rotatable or translatable manner, the intermediate member is not required to have a drive unit for translating or rotating the movable body. Therefore, the weights of the intermediate member and the movable member each decrease by an amount corresponding to the weight of a drive unit, so that the movable body can be displaced at high speed.

Further, the operation rods, which move the movable body via the pivot portions, are operated by movements of the corresponding drive blocks. Since the movement of each drive block is a single straight motion, accurate control of the movement distance of the drive block is easy. Therefore, the pivot portions of the movable body can be moved accurately through movement of the drive blocks, whereby the movable body can be displaced accurately. Moreover, since the movement distance of each drive block can be controlled easily with high accurately, the plurality of drive blocks can be moved simultaneously with high accuracy, whereby the movable body can be displaced accurately through simultaneous, accurate operation of the plurality of operation rods.

Preferably, the parallel link mechanism further comprises detection means for detecting actual displacement of the movable body relative to the base. In such a case, data representing the actual displacement detected by use of the detection means are used to correct positional errors stemming from the dimensional errors of the operation rods or perform feedback control, to thereby enable accurate drive of the drive blocks. Thus, the movable body can be displaced to a desired position with high accuracy.

Preferably, of the operation rods, at least two operation rods are disposed symmetrically on opposite sides of a reference line along which the grinding wheel and the workpiece are disposed to face each other. In this case, the operation rods can sustain, in a distributed manner, stresses acting on the movable body along the reference line.

Preferably, of the operation rods, at least two operation rods intersect each other. The plurality of operation rods pivotably connected to the movable body extend from the movable body, so that the overall sizes of the parallel link mechanisms are determined by the lengths of portions of the operation rods extending from the movable body. However, the above-mentioned configuration shortens the lengths of portions of the operation rods extending from the movable body, to thereby reduce the overall size of the parallel link mechanisms.

Preferably, the parallel link mechanism further comprises an additional support member for supporting the movable body in such a manner that the movable body can translate and rotate within a plane on the base. In this case, since the weight of the movable body is supported by the support member, the weight of the movable body does not act on the operation rods as a load. Therefore, the structure of the operation rods can be simplified, and high dimensional accuracy can be secured. Further, since the weight of the movable body does not act on the drive blocks as a load, the drive blocks can be moved smoothly and accurately. Therefore, the movable body can be displaced more accurately.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

First Embodiment

A cylindrical grinder according to a first embodiment of the invention will be described with reference to the drawings.

Figure 1:
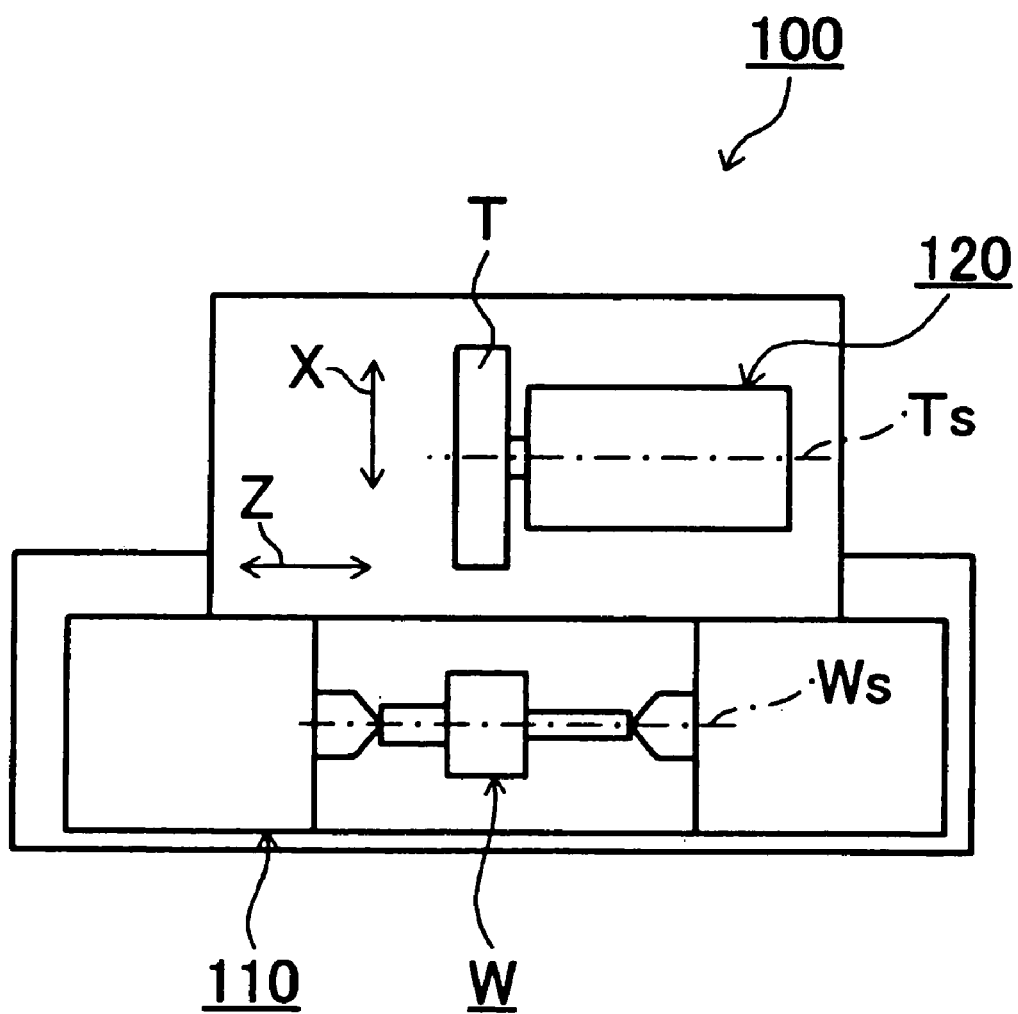
FIG. 1 is a plan view of a conventional cylindrical grinder.
Figure 2:
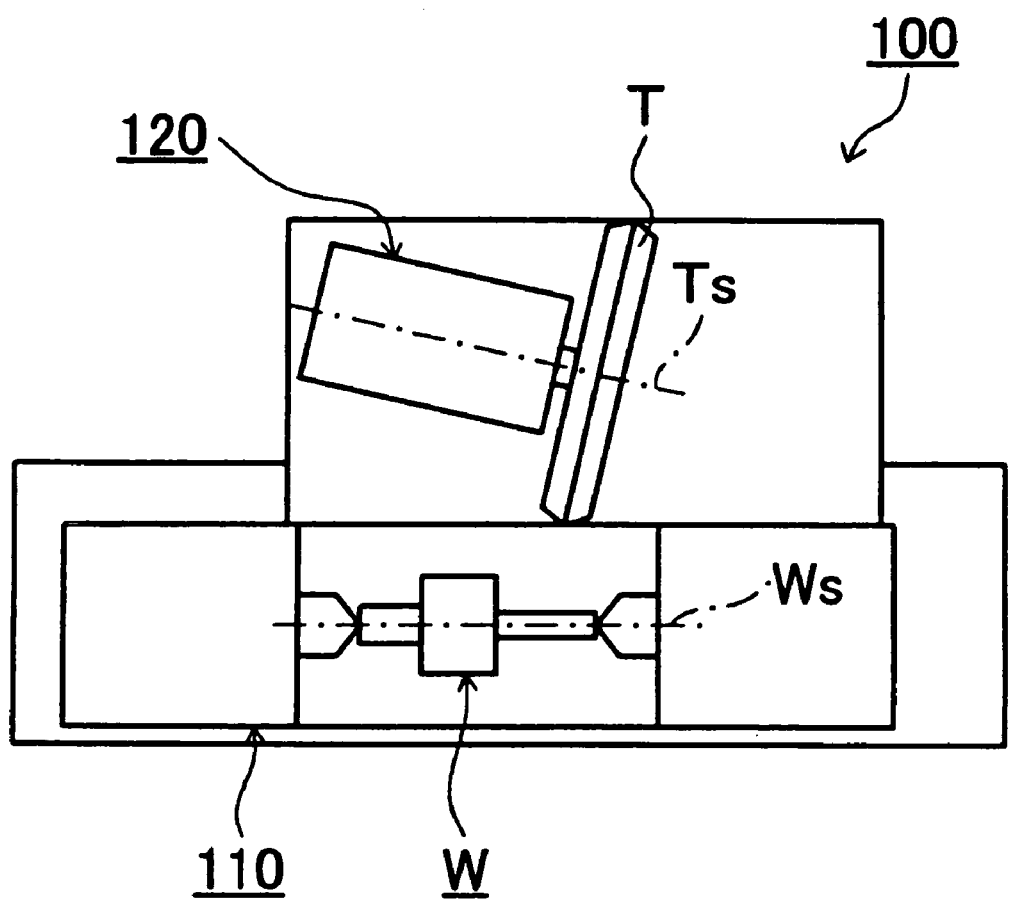
FIG. 2 is a plan view of another conventional cylindrical grinder.
Figure 3:
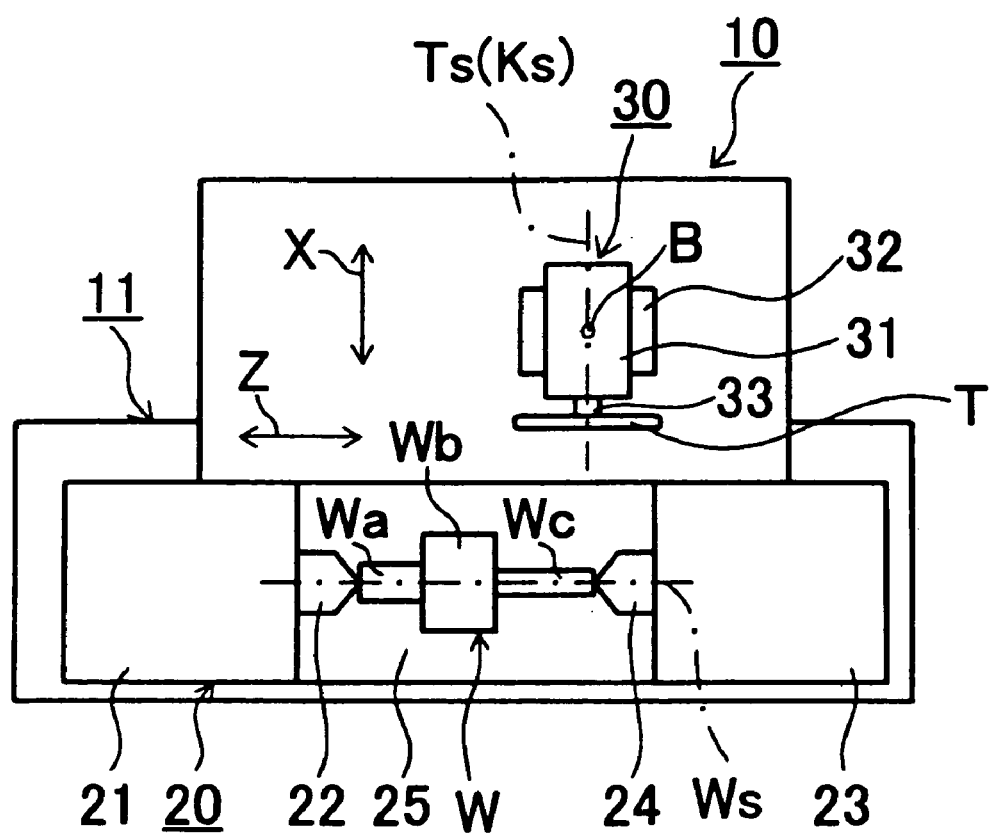
FIG. 3 is a plan view of a cylindrical grinder according to a first embodiment of the invention.

As shown in FIG. 3, a cylindrical grinder 10 according to the present embodiment includes a bed 11, serving as a base; a workpiece support section 20 disposed on a front portion of the bed 11 and supporting a workpiece W in such a manner that the workpiece W extends along the left-right direction; and a wheel head section 30 disposed on a rear portion of the bed 11 and having a wheel head 31 to which a disc-shaped grinding wheel T is attached. The workpiece support section 20 includes a table 25 disposed on the top surface of the bed 11 to be slidable along the Z-axis direction; a spindle head 21 fixedly disposed on the top surface of the table 25; and a tailstock 23 disposed on the top surface of the table 25 to be slidable along the Z-axis direction. A center 22 is attached to the main spindle 21 in such a manner that the center 22 can rotate about the Z axis. Similarly, a center 24 is attached to the tailstock 23 in such a manner that the center 24 can rotate about the Z axis. The workpiece W is held by and between the center 22 of the spindle head 21 and the center 24 of the tailstock 23 for rotation about the Z axis. Notably, the workpiece support section 20 is not limited to the above-described arrangement having the tailstock 23 and may be configured such that the spindle head 21 has a chuck for supporting a workpiece in a cantilever fashion.

Further, an unillustrated annular main spindle, which surrounds the center 22 of the spindle head 21, is built into the spindle head 21 and is rotated by means of a drive unit such as a motor. During grinding operation, the workpiece w is rotated by the main spindle via an unillustrated driving member attached to the workpiece W. In the present embodiment, since the spindle head and the driving member have known structures, their detailed descriptions are omitted.

The wheel head section 30 includes a wheel head base 32 disposed on the top surface of the bed 11 to be slidable along the X-axis direction; and the above-described wheel head 31, which has a wheel spindle 33 to which the grinding wheel T is attached. The wheel head 31 is supported by the wheel head base 32 in such a manner that the wheel head 31 can be turned horizontally about a rotation axis B. The wheel spindle 33 of the wheel head 31 is rotated by a drive unit such as a motor, directly or indirectly via, for example, pulleys and V-belts, whereby the attached grinding wheel T is rotated. The range in which the wheel head 31 can be turned is set in such a manner that the wheel spindle 33; i.e., the rotational axis Ts of the grinding wheel T, can be tilted leftward or rightward from a reference plane Ks perpendicular to the rotational axis Ws of the workpiece W within a range extending across the reference plane Ks.

Figure 4:
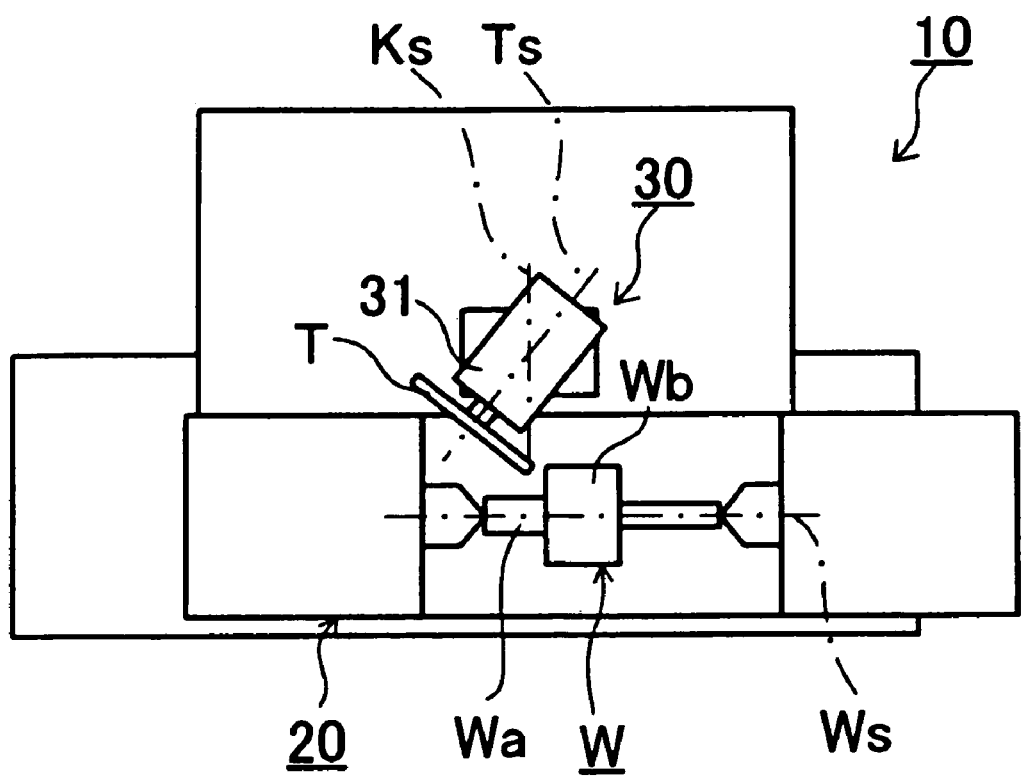
FIG. 4 is a plan view showing a state in which the rotational axis of a grinding wheel is tilted leftward.
Figure 5:
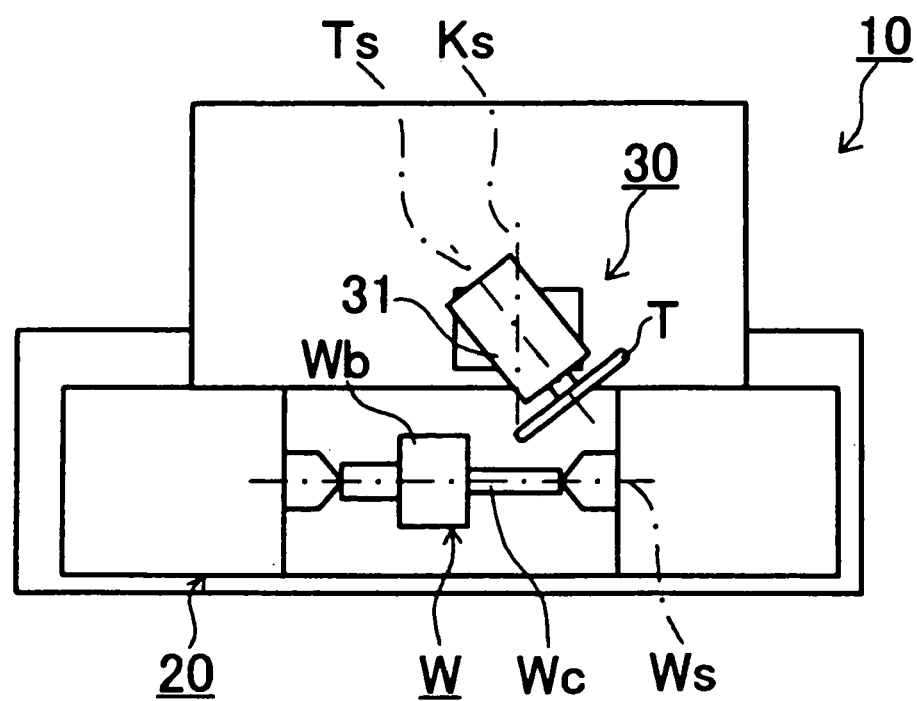
FIG. 5 is a plan view showing a state in which the rotational axis of the grinding wheel is tilted rightward.

In the cylindrical grinder 10 of the present embodiment, by means of slide movement of the table 25 of the workpiece support section 20 along the Z-axis direction and slide movement of the wheel head base 32 of the wheel head section 30 along the X-axis direction, the wheel head 31 is moved relative to the workpiece W along the Z-axis direction and the X-axis direction. Further, as shown in FIGS. 4 and 5, when the wheel head 31 is turned clockwise or counterclockwise relative to the wheel head base 32, the rotational axis Ts of the grinding wheel T is tilted leftward or rightward with respect to the reference plane Ks perpendicular to the rotational axis Ws of the workpiece W. In the present embodiment, the wheel head 31 is turned along a horizontal plane including the rotational axis Ws of the workpiece W. Therefore, irrespective of an angle through which the rotational axis Ts of the grinding wheel T is tilted upon turning of the wheel head 31, the point of contact between the grinding wheel T and the workpiece W; i.e., grinding point, is located on the horizontal plane including the rotational axis Ws of the workpiece W.

FIG. 4 shows a state in which the wheel head 31 has been turned clockwise to thereby tilt the rotational axis Ts of the grinding wheel T to the left from the reference plane Ks. In this state, a circumferential surface of a left-hand shaft portion Wa, a left-hand end surface of a larger diameter portion Wb, and a circumferential surface of the larger diameter portion Wb, which are outer surfaces of the workpiece W, are ground by use of corners of a right-hand portion of the grinding wheel T. More specifically, the circumferential surfaces of the left-hand shaft portion Wa and the larger diameter portion Wb of the workpiece W are ground by use of a front-side corner of the grinding wheel T; and the left-hand end surface of the larger diameter portion Wb of the workpiece W is ground by use of a back-side corner of the grinding wheel T. Meanwhile, FIG. 5 shows a state in which the wheel head 31 has been turned counterclockwise to thereby tilt the rotational axis Ts of the grinding wheel T to the right from the reference plane Ks. In this state, a circumferential surface of a right-hand shaft portion Wc and a right-hand end surface of the larger diameter portion Wb, which are outer surfaces of the workpiece W, are ground by use of corners of a left-hand portion of the grinding wheel T. More specifically, the circumferential surface of the right-hand shaft portion Wc of the workpiece W is ground by use of a front-side corner of the grinding wheel T; and the right-hand end surface of the larger diameter portion Wb of the workpiece W is ground by use of a back-side corner of the grinding wheel T.

When the cylindrical grinder 10 is configured such that the wheel head 31 can be turned through 90° or more in each of clockwise and counterclockwise directions (through 180° or more in total), the rotational axis Ts of the grinding wheel T can be tilted over a wide range, from a position at which the rotational axis Ts of the grinding wheel T perpendicularly intersects the rotational axis Ws of the workpiece W to a position at which the rotational axis Ts of the grinding wheel T becomes parallel to the rotational axis Ws of the workpiece W. This enables not only angular-slide grinding, but also other various types of grinding, such as traverse cut grinding and plunge cut grinding, which are performed while the rotational axis Ts of the grinding wheel T is maintained parallel to the rotational axis Ws of the workpiece W. The turning range of the wheel head 31 in each of clockwise and counterclockwise directions may be reduced to 90° or less (180° or less in total) or even to 45° or less (90° or less in total), because the opposite end surfaces of the workpiece W can be ground by means of angular-slide grinding, so long as the wheel head 31 can be turned leftward and rightward from the reference plane Ks. When the turning range of the wheel head 31 is narrowed as described above, the mechanism for rotating the wheel head 31 can be simplified.

The cylindrical grinder according to the first embodiment of the present invention has been described. However, the cylindrical grinder according to the present invention is not limited to the cylindrical grinder as described above and may be modified in various manners as described below.

In the embodiment, the turning center of the wheel head is located on the rotational axis of the grinding wheel and in back of the grinding wheel. However, the turning center of the wheel head may be located at a position offset from the rotational axis of the grinding wheel, or may be located at the center of the grinding wheel or the contact point between the grinding wheel and the workpiece; i.e., the grinding point.

The structure for enabling the turning of the wheel head relative to the workpiece is not limited to the structure employed in the embodiment. The wheel head base may be supported on the bed to be turnable along a horizontal plane, and the wheel head may be disposed on the wheel head base to be slidable along the rotational axis of the grinding wheel. In this modified embodiment, when the wheel head base is turned relative to the bed, the wheel head is turned relative to the workpiece, so that the rotational axis of the grinding wheel is tilted with respect to the reference plane perpendicular to the rotational axis of the workpiece. Further, in this modified embodiment, when the wheel head is moved on the turned wheel head base, the grinding wheel is moved along a direction inclined relative to the X-axis and Z-axis directions. This enables the grinding wheel to move along a taper surface of a workpiece to be ground, whereby the control for moving the wheel head is simplified.

The workpiece support section may include a lower table which is disposed on the bed to be slidable along the Z-axis direction; and an upper table which is supported on the lower table to be turned horizontally (so called slide table or swivel table) and on which a workpiece is supported. This modified embodiment enables the wheel head to be tilted relative to the workpiece through turning of the upper table even when the wheel head is fixed at a position at which the rotational axis of the workpiece is located on the reference plane perpendicular to the rotational axis of the workpiece.

The structure for enabling the wheel head to be moved relative to the workpiece along the Z-axis and X-axis directions is not limited to the structure employed in the embodiment. For example, the wheel head may be disposed on the bed to be movable along the Z-axis and X-axis directions. Alternatively, the workpiece support section may be disposed on the bed to be movable along the Z-axis and X-axis directions.

The wheel head may be turned or translated relative to the workpiece along the Z-axis and X-axis directions by means of various link mechanisms, such as a parallel link mechanism which includes two slide bocks slidably disposed on the bed and two arms whose first ends are pivotably attached to the corresponding slide blocks and whose second ends are pivotably attached to the wheel head.

Preferably, suitable drive units such as servomotors and linear motors are used to drive the above-described various members such as the table of the workpiece support section, the wheel head base and the wheel head of the wheel head section, and various link mechanisms; and the drive units are controlled by means of a numerical controller such as a CNC controller. When the various members are moved by means of numerical control, the translation of the wheel head relative to the workpiece along the Z-axis and X-axis directions and the turning angle of the wheel head can be controlled accurately. Therefore, various types of grinding, such as outer surface grinding, end surface grinding, and taper surface grinding, can be performed automatically throughout the entire length of the workpiece, and this is convenient for grinding small quantities of workpieces of a large number of types.

The cylindrical grinder according to the present invention can grind a workpiece while tilting the grinding wheel leftward and rightward relative to the workpiece. Therefore, the cylindrical grinder according to the present invention advantageously employs a disk-shaped grinding wheel which has on its circumferential surface a taper surface of a proper angle, more preferably, a plurality of taper surfaces. In this case, during grinding operation, the grinding wheel is tilted in such a manner that a selected taper surface of the grinding wheel becomes parallel to a circumferential surface or an end surface of the workpiece to be ground. This grinding method will be described below.

Figure 6:
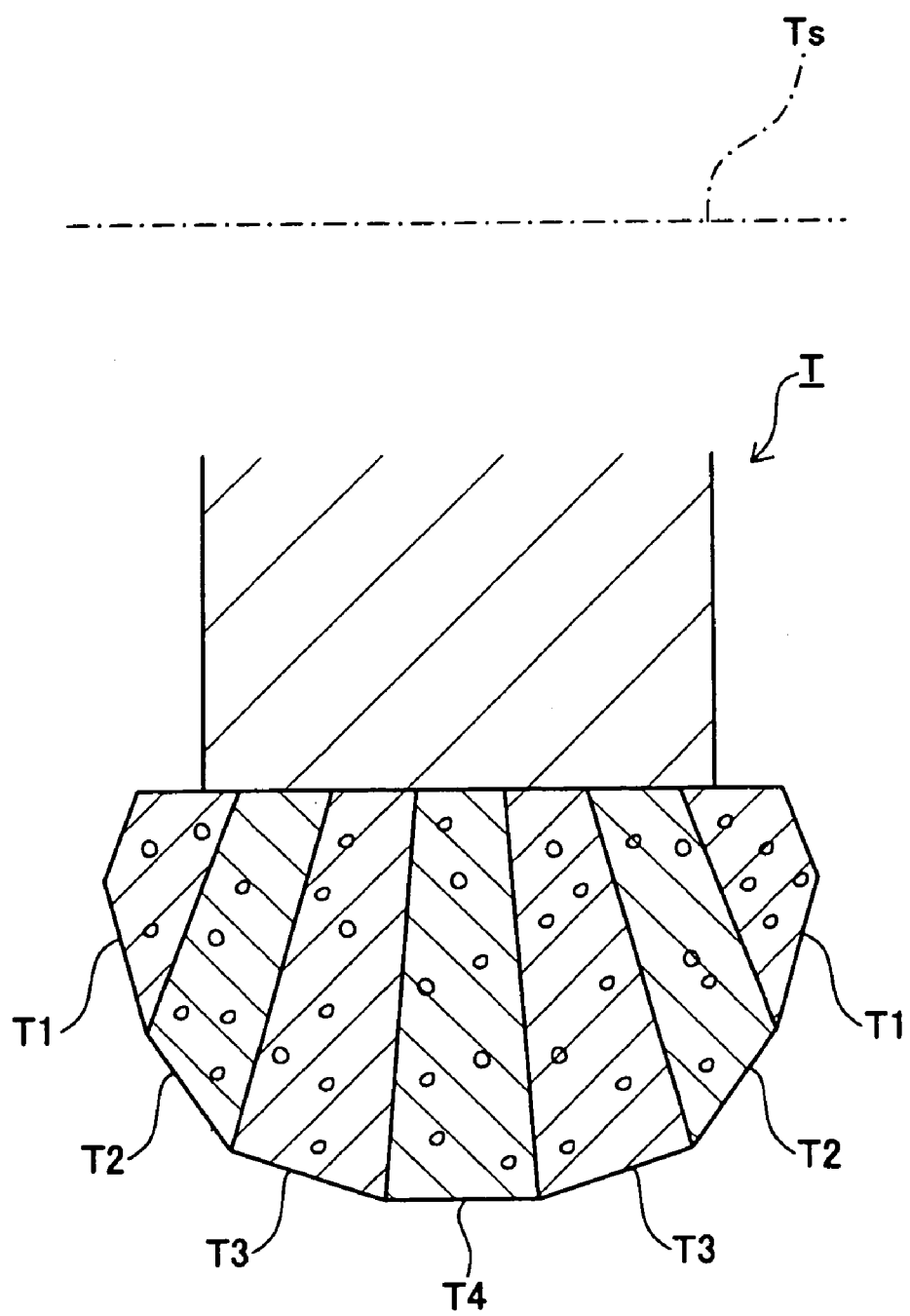
FIG. 6 is a cross-sectional view of a main portion of an example grinding wheel.

FIG. 6 shows a cross section of a peripheral edge portion of a grinding wheel T formed in a disc-like shape. A plurality of taper surfaces of predetermined angles are formed on the circumferential surface of the grinding wheel T. Specifically, the front-side and rear-side halves of the grinding wheel T are formed symmetrically in such a manner that three grinding faces T1, T2, and T3 are formed on each of the front-side and rear-side halves of the grinding wheel T. The first grinding face T1 has a taper angle greater than 45° with respect to the rotational axis Ts of the grinding wheel T. The second grinding face T2 has a taper angle of about 45° with respect to the rotational axis Ts of the grinding wheel T. The third grinding face T3 has a taper angle less than 45° with respect to the rotational axis Ts of the grinding wheel T. Further, a fourth grinding face T4 substantially parallel to the rotational axis Ws of the workpiece W (i.e., having a taper angle of substantially zero) is formed at the center portion of the circumferential surface of the grinding wheel T.

Among the first through fourth grinding faces T1 to T4, at least two grinding faces are formed from grinding stones designed for different grinding operations which differ from each other in at least one of three properties of grinding stones; i.e., "abrasive grains," "bonding material," and "pores." For example, the first grinding face T1 is formed of a grinding stone for rough finish grinding which contains abrasive grains having a grain size of #60; the second grinding face T2 and the third grinding face T3 are formed of a grinding stone for intermediate finish grinding which contains abrasive grains having a grain size of #80; and the fourth grinding face T4 is formed of a grinding stone for fine finish grinding which contains abrasive grains having a grain size of #120.

Figure 7:
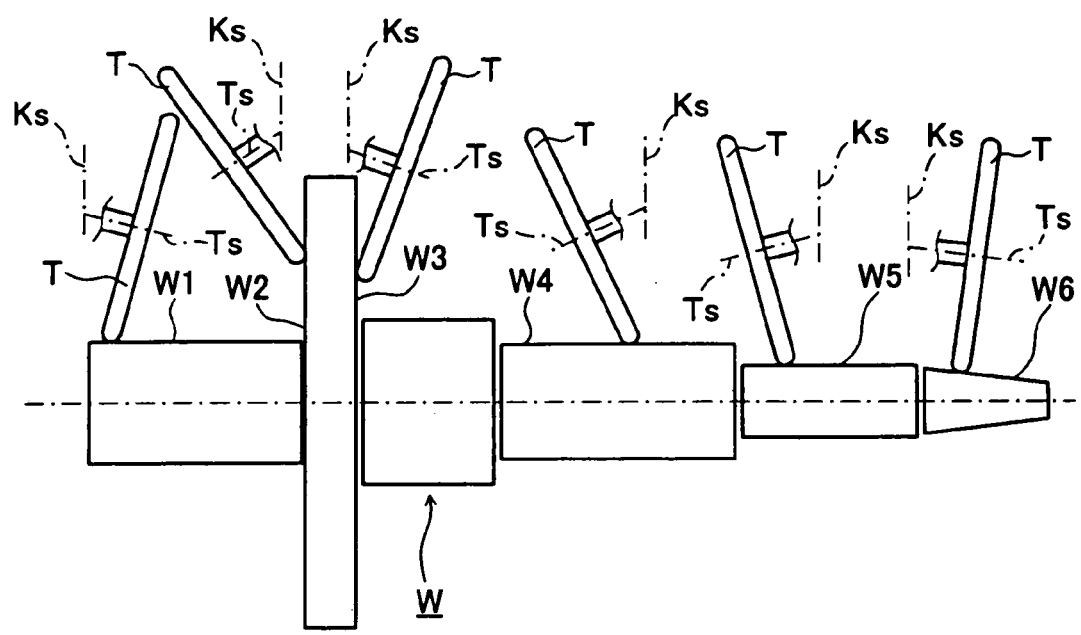
FIG. 7 is a plan view showing a method of grinding a workpiece by use of the grinding wheel shown in FIG. 6.

When grinding operation is performed by use of such a grinding wheel T, as shown in FIG. 7, the grinding wheel is tilted at a proper angle with respect to the workpiece W in order to perform the grinding operation by use of a grinding face corresponding to the type of finishing to be performed. Such grinding operation will be described with reference to FIG. 7.

A portion W1 of a workpiece W is a circumferential surface which requires intermediate finishing. In order to grind the portion W1, the rotational axis Ts of the grinding wheel T is tilted to the right with respect to the reference plane Ks perpendicular to the rotational axis Ws of the workpiece W, in such a manner that the third grinding face T3 becomes parallel to the portion (circumferential surface) W1. In this state, the portion (circumferential surface) W1 is ground by use of the third grinding face T3. A portion W2 of the workpiece W is a left-hand end surface which requires intermediate finishing. In order to grind the portion W2, the rotational axis Ts of the grinding wheel T is tilted to the left with respect to the reference plane Ks in such a manner that the second grinding face T2 becomes parallel to the portion (end surface) W2. In this state, the portion (end surface) W2 is ground by use of the second grinding face T2. A portion W3 of the workpiece W is a right-hand end surface which requires rough finishing. In order to grind the portion W3, the rotational axis Ts of the grinding wheel T is tilted to the right with respect to the reference plane Ks in such a manner that the first grinding face T1 becomes parallel to the portion (end surface) W3. In this state, the portion (end surface) W3 is ground by use of the first grinding face T1. A portion W4 of the workpiece W is a circumferential surface which requires intermediate finishing. In order to grind the portion W4, the rotational-axis Ts of the grinding wheel T is tilted to the left with respect to the reference plane Ks in such a manner that the second grinding face T2 becomes parallel to the portion (circumferential surface) W4. In this state, the portion (circumferential surface) W4 is ground by use of the second grinding face T2. A portion W5 of the workpiece W is a circumferential surface which requires intermediate finishing. In order to grind the portion W5, the rotational axis Ts of the grinding wheel T is tilted to the left with respect to the reference plane Ks in such a manner that the third grinding face T3 becomes parallel to the portion (circumferential surface) W5. In this state, the portion (circumferential surface) W5 is ground by use of the third grinding face T3. A portion W6 of the workpiece W is a taper surface which requires fine finishing. In order to grind the portion W6, the rotational axis Ts of the grinding wheel T is tilted to the right with respect to the reference plane Ks in such a manner that the fourth grinding face T4 becomes parallel to the portion (taper surface) W6. In this state, the portion (taper surface) W6 is ground by use of the fourth grinding face T4.

In the above-described example, each of the portions W4 and W5 of the workpiece W is a circumferential surface which requires intermediate finishing, and therefore, both the portions can be ground by use of only one of the second and third grinding faces T2 and T3. However, the above-described grinding method in which one portion is ground by use of the second grinding face T2 and the other portion is ground by use of the third grinding face T3; i.e., a method in which portions requiring the same finish grinding are ground by use of different grinding faces, is preferable. This grinding method prevents so-called "local wear"; a phenomenon such that a certain grinding face wears more rapidly than do other grinding faces, which phenomenon would otherwise occur when a grinding face for intermediate finishing of a grinding wheel T is used more frequently than the remaining grinding faces. Thus, the service life of the grinding wheel T can be extended.

As described above, when the above-described grinding wheel is used in the cylindrical grinder of the present invention, a single grinding wheel can be used to perform various types of grinding for outer surfaces of a workpiece. Further, the circumferential surface of the grinding wheel can be used effectively over the entire width thereof.

Notably, in the above-described embodiment, grinding conditions such as feed rate and feed amount may be changed depending on a grinding face to be used and a type of a workpiece surface to be finished. This enables setting of grinding conditions suitable for the type of the grinding wheel and the type of a surface to be finished, to thereby improve quality and shorten machining time. The plurality of tapered grinding faces of different angles may be formed from a single type of grinding stone. Even in this case, the grinding conditions may be changed properly depending on a grinding face to be used.

Second Embodiment

Figure 8:
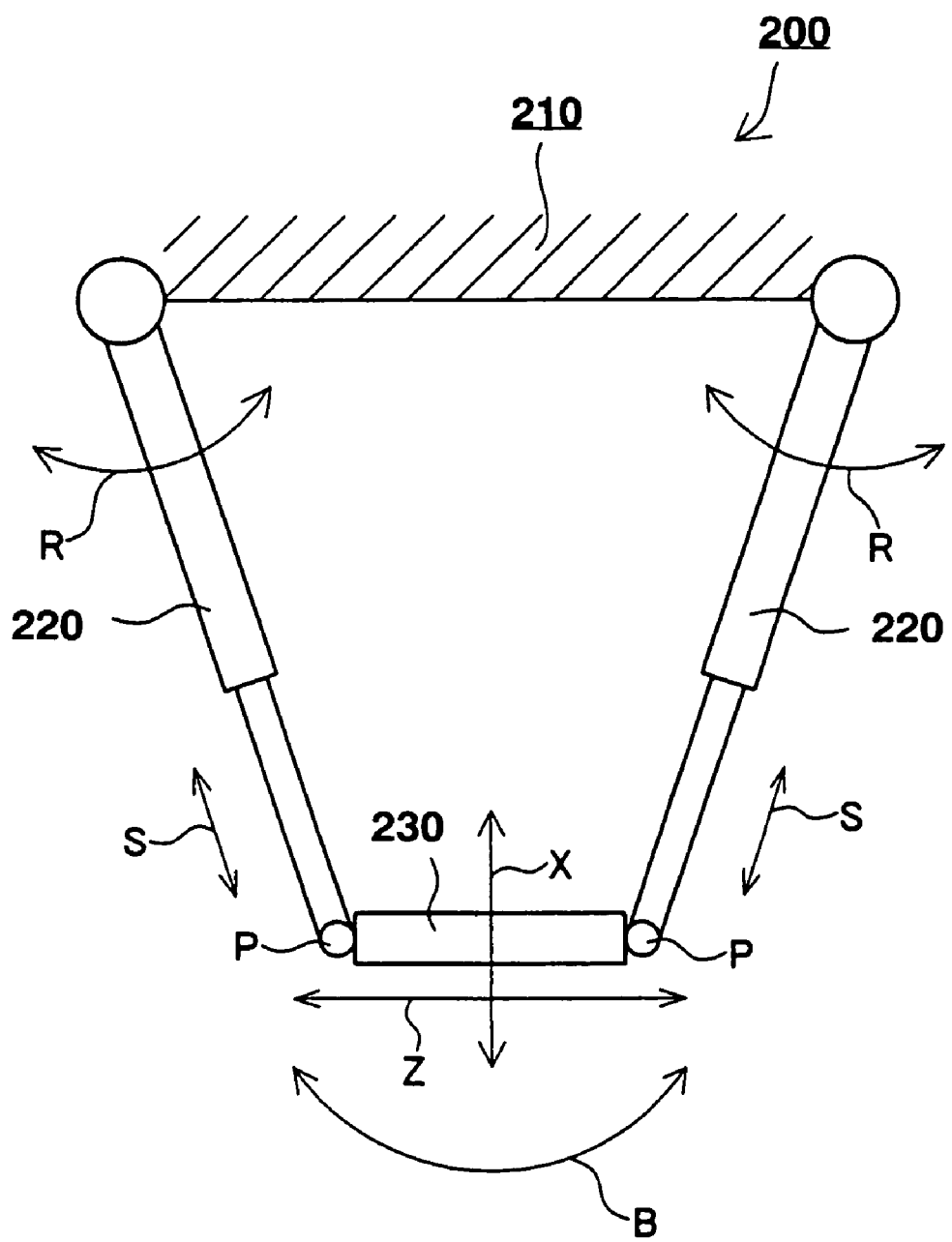
FIG. 8 is a plan view of a parallel link mechanism.

The grinding wheel T may be moved relative to the workpiece W by use of a parallel link mechanism 200 shown in FIG. 8. The parallel link mechanism 200 includes a pair of telescopic operation rods 220 whose first ends are pivotably connected to a movable body 230 and whose second ends are pivotably connected to a base 210. In the parallel link mechanism 200, the movable body 230 can be translated along the Z-axis and X-axis directions through operation of extending and contracting the operation rods 220 and rotating the operation rods 220 relative to the base 210. Further, the movable body 230 can be turned or tilted horizontally as indicated by arrow B. Specifically, the movable body 230 can be translated along the X-axis direction through operation of extending or contracting the left-hand and right-hand operation rods 220 by the same amount and rotating them in opposite directions through equal angles. Also, the movable body 230 can be translated along the Z-axis direction through operation of rotating the left-hand and right-hand operation rods 220 in the same direction while extending and contracting the rods 220, respectively, by different distances. Further, the movable body 230 can be rendered parallel to the Z-axis or tilted as indicated by arrow B through operation of extending or contacting one of the operation rods 220 by a predetermined distance and rotating the same through a predetermined angle, while fixing the extension distance and rotational angle of the other operation rod 220.

In the parallel link mechanism 200, the movable body 230 cannot be translated or tilted accurately unless the opposite ends of the movable body 230, to which the operation rods 220 are pivotably connected, are moved accurately. For such accurate movement, extension/contraction motion and rotation motion of the operation rods 220 must be controlled simultaneously and accurately. However, since the extension/contraction motion is linear motion and the rotation motion is rotational motion, these motions are difficult to control simultaneously and accurately, rendering accurate control of the operation rods difficult. Further, accurately operating the pair of operation rods 220 is even more difficult than accurately operating either rod alone, which is difficult in itself. Therefore, the parallel link mechanism 200 cannot displace the movable body 230 accurately and is not suitable for use as a mechanism for moving a grinding wheel relative to a workpiece in a cylindrical grinder, which performs accurate machining.

Figure 9:
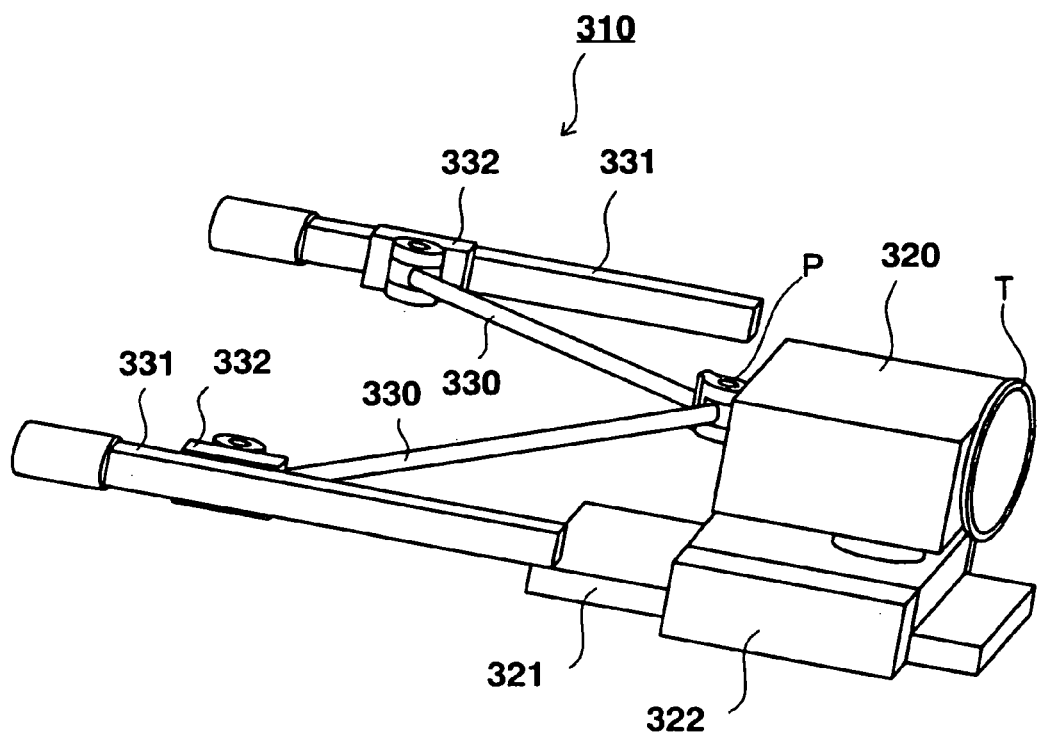
FIG. 9 is a perspective view of a parallel link mechanism according to a second embodiment of the invention.

A parallel link mechanism 310 according to a second embodiment of the present invention shown in FIG. 9 can solve the above-described drawback.

The parallel link mechanism 310 includes a guide rail 321 fixed to a bed (a base) of a cylindrical grinder; a pedestal 322 slidably supported on the guide rail 321; a movable body (wheel head) 320 rotatably disposed on the pedestal 322; a pair of rails 331 fixedly disposed on the bed to be located on the opposite sides of the movable body 320 and to extend along the direction of slide movement of the pedestal 322; drive blocks 332 slidably supported by the respective rails 331; and a pair of operation rods 330 whose first ends are pivotably connected to a rear end portion (pivot portion) P of the movable body 320 and whose second ends are pivotably connected to the respective drive blocks 332. The drive blocks 332 slidably supported by the respective rails 331 are moved independently along the rails 331 by means of drive units each employing a feed screw driven by a servomotor, or by means of drive units each employing a linear motor. When the drive blocks 332 are moved, the movements of the drive blocks 332 are transmitted to the pivot portion P of the movable body 320 via the operation rods 330, whereby the movable body 320 is translated and rotated relative to the bed.

Figure 10:
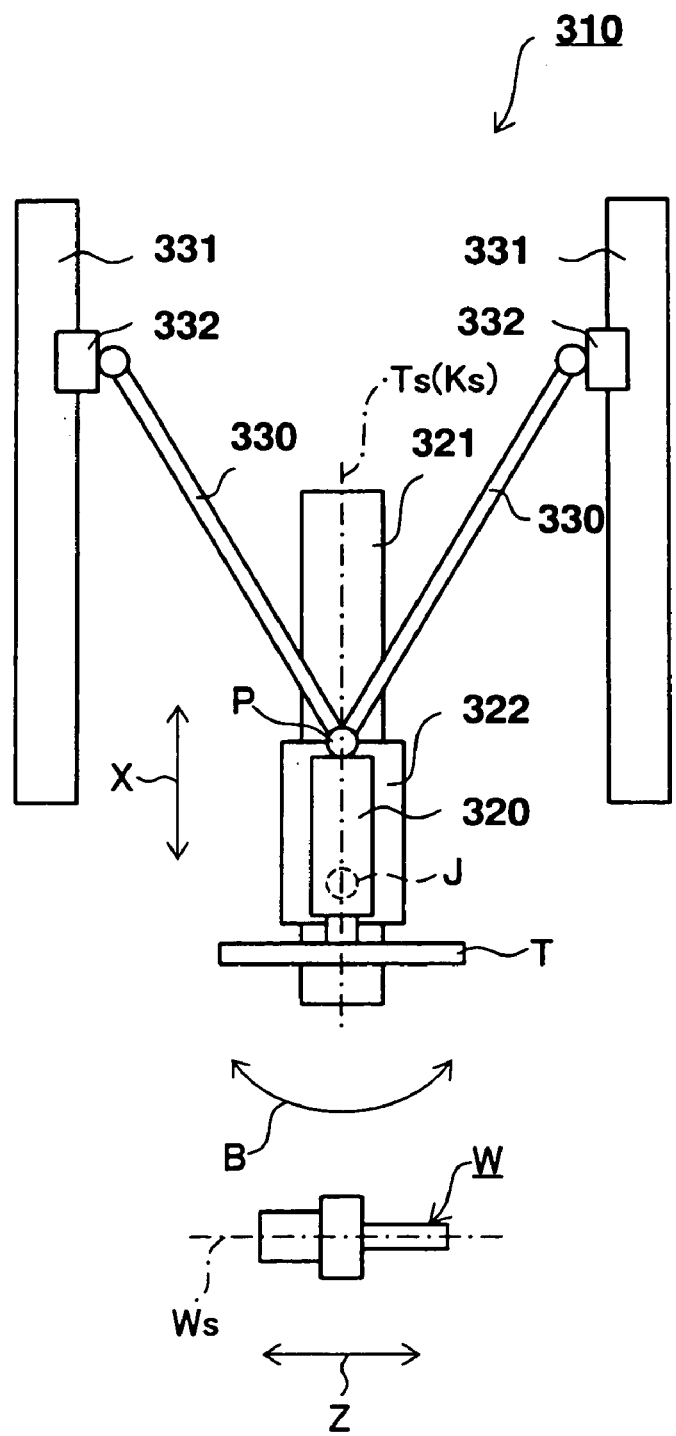
FIG. 10 is a plan view showing an operated state of the parallel link mechanism of FIG. 9.

Next, operation of the parallel link mechanism 310 will be described. FIG. 10 shows a state in which the left-hand and right-hand drive blocks 332 are positioned at the same position along the X-axis direction. In this state, the rotational axis Ts of a grinding wheel T extends parallel to the X-axis direction, so that the front face of the grinding wheel T faces a workpiece W. As described in the first embodiment, a table supporting the workpiece W is translated along the Z-axis direction; and the movable body (wheel head) 320 supporting the grinding wheel T is translated along the X-axis direction. Further, the movable body 320 is rotated clockwise and counterclockwise about a pivot J provided on the pedestal 322, as indicated by arrow B. This rotation motion, which will be referred to as "movement along direction B," is used to tilt the rotational axis Ts of the grinding wheel T to the left or right from a reference plane Ks perpendicular to the rotational axis Ws of the workpiece W.

When the left-hand and right-hand drive blocks 332 are moved by equal distances from the positions shown in FIG. 10, the pivot portion P of the movable body 320 is translated along the X-axis direction without any rotation, whereby the movable body 320 translates straight along the X-axis direction. The movable body 320 translates smoothly with high straightness, because the pedestal 322 accurately slides along the X-axis direction. In contrast, when the left-hand and right-hand drive blocks 332 are moved by different distances, the pivot portion P of the movable body 320 deviates from the reference plane Ks, whereby the movable body 320 is turned about the pivot J along direction B. As a result, the rotational axis Ts of the grinding wheel T is tilted from the reference plane Ks.

Figure 11:
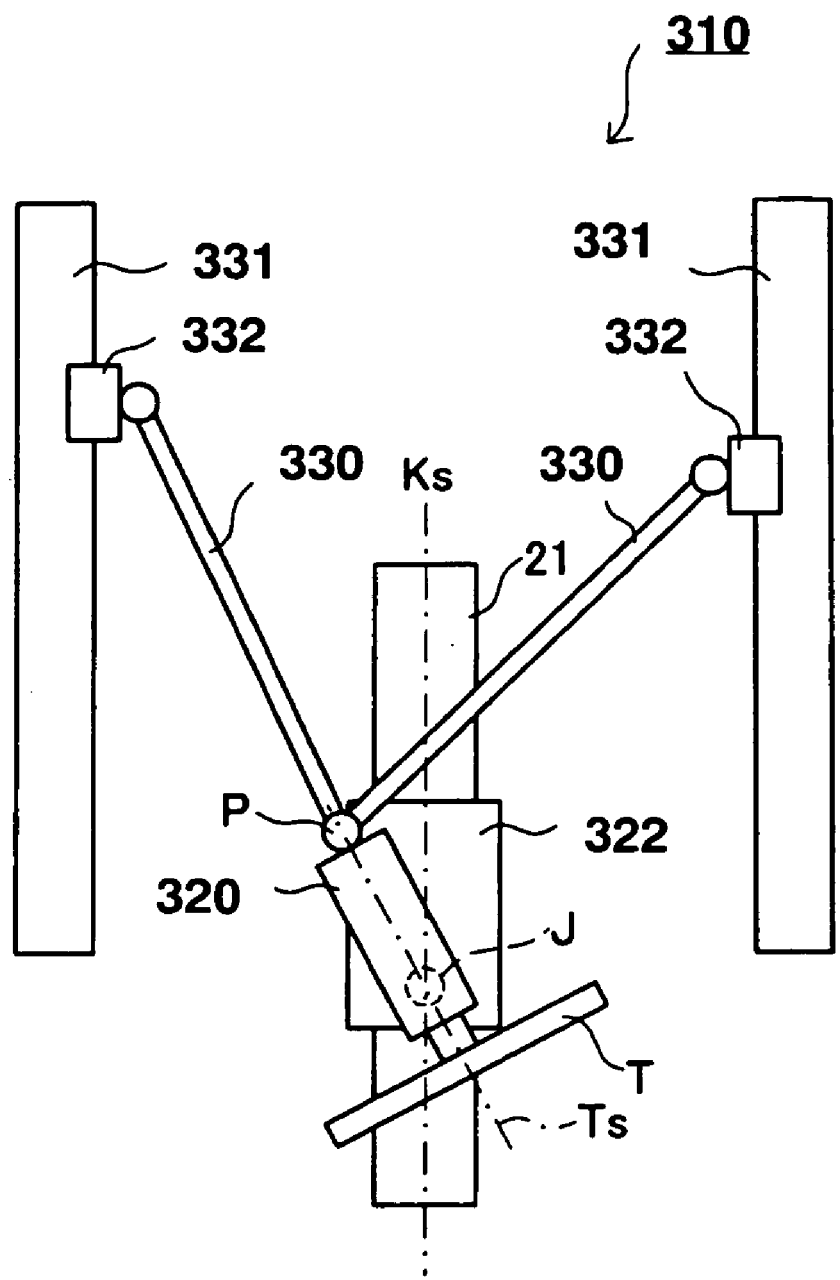
FIG. 11 is a plan view showing another operated state of the parallel link mechanism of FIG. 9.

FIG. 11 shows a state in which the right-hand drive block 332 has moved further forward relative to the left-hand drive block 332. In this state, the rotational axis Ts of the grinding wheel T is tilted rightward from the reference plane Ks, and thus, a left-hand portion of the grinding wheel T is positioned forward relative to the center of the grinding wheel T in order to grind the workpiece W. More specifically, an outer circumferential surface and an end surface of the workpiece W are ground by use of corners of the left-hand portion of the grinding wheel T. When the left-hand and right-hand drive blocks 332 are moved further by equal distances, the movable body 320 is translated along the X-axis direction while maintaining the tilted posture. The distance of movement along the X-axis direction and the rotational angle along direction B can be changed freely through an operation of variably and independently setting the respective movement distances of the left-hand and right-hand drive blocks 332.

Figure 12:
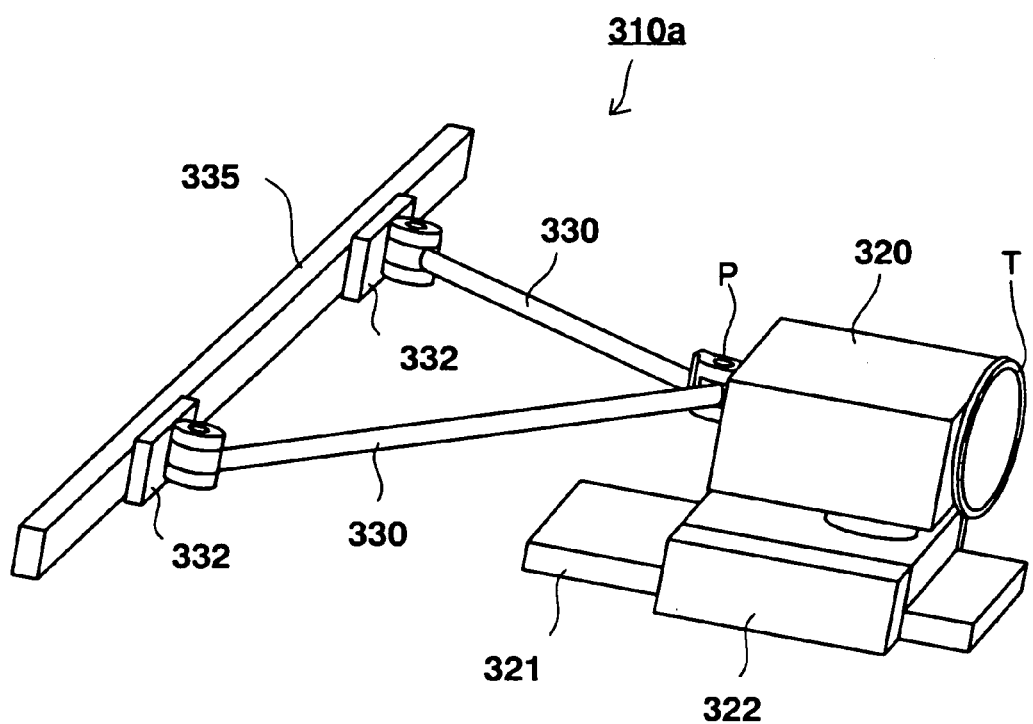
FIG. 12 is a perspective view showing a modification of the parallel link mechanism according to the second embodiment.

FIG. 12 shows a parallel link mechanism 310a according to a first modification of the second embodiment of the present invention. The parallel link mechanism 310a is identical with that of the second embodiment shown in FIGS. 9 and 10, except for the structure for slidably supporting the left-hand and right-hand drive blocks 332. Therefore, descriptions of components identical with those of the parallel link mechanism shown in FIGS. 9 and 10 will not be repeated.

In the parallel link mechanism 310a according to the present modification, the left-hand and right-hand drive blocks 332 are slidably supported on a single rail 335, which is fixed to the bed at the rear of the movable body 320, and extends along a direction perpendicular to the direction of slide movement of the pedestal 322; i.e., along the Z-axis direction. Therefore, the drive blocks 332 move along the Z-axis direction. In the present modification, a linear motor is employed as a drive unit for the drive blocks 332, because the linear motor can move the drive blocks 332 individually on the single rail 335. In the present modification, since the drive blocks 332 are guided and supported by a single rail, the overall structure can be simplified, and cost can be reduced. The rail 335 may be divided into two sections in order to individually support the left-hand and right-hand drive blocks 332. Further, drive units each employing a servo-motor-driven feed screw may be disposed at opposite ends of the single rail 335 in order to individually move the left-hand and right-hand drive blocks 332.

The parallel link mechanism 310a of the present modification can translate the movable body 320 along the X-axis direction and rotate the movable body 320 about the pivot on the pedestal 322, by individually controlling the movements of the left-hand and right-hand drive blocks 332.

Figure 13:
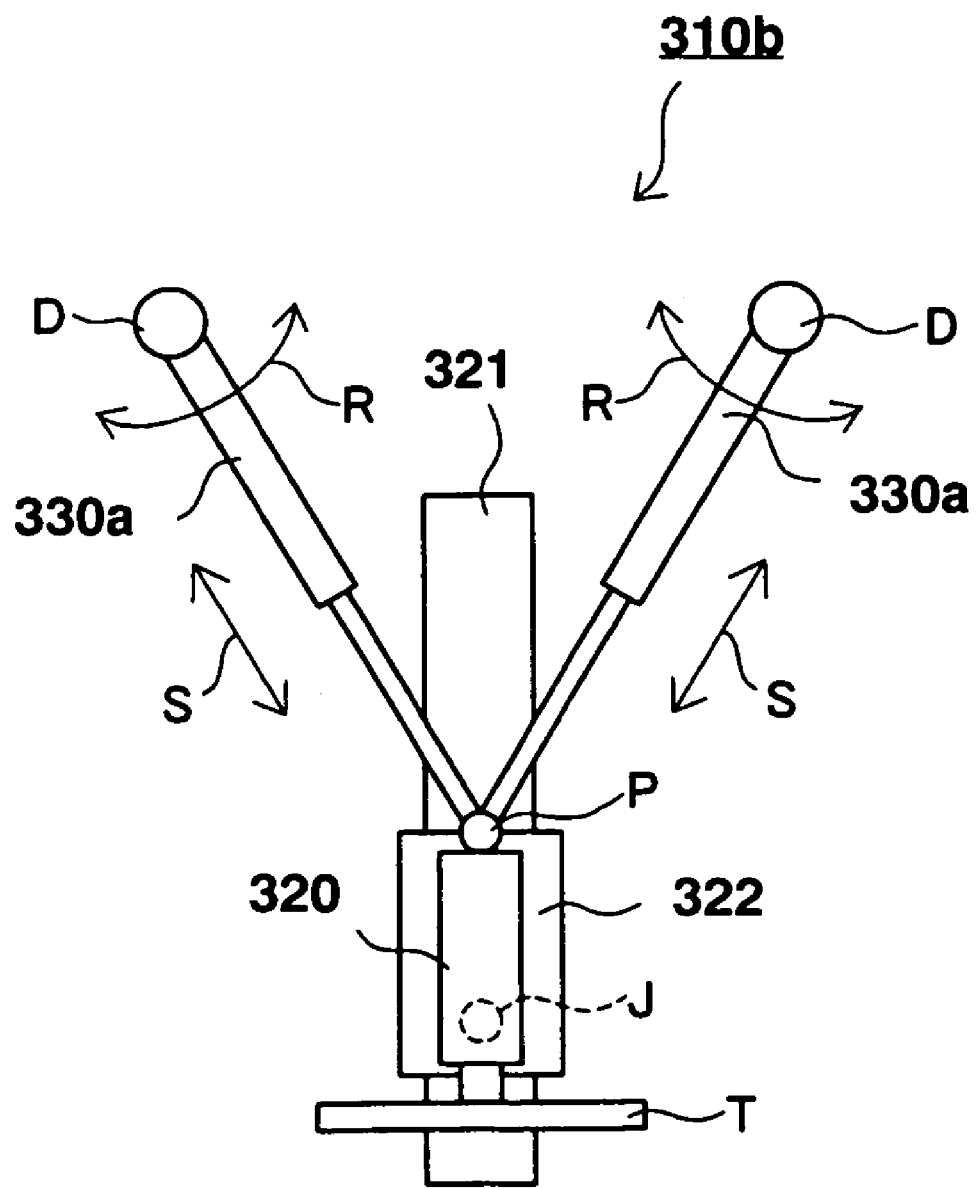
FIG. 13 is a plan view showing another modification of the parallel link mechanism according to the second embodiment.

FIG. 13 shows a parallel link mechanism 310b according to a second modification of the second embodiment of the present invention. The parallel link mechanism 310b is identical with that of the second embodiment shown in FIGS. 9 and 10, except for the structures of the left-hand and right-hand operation rods 330a. Therefore, descriptions of components identical with those of the parallel link mechanism shown in FIGS. 9 and 10 will not be repeated.

In the parallel link mechanism 310b according to the present modification, the left-hand and right-hand operation rods 330a are each configured to be extendable and contractable. First ends of the operation rods 330a are pivotably connected the pivot portion P of the movable body 320; and second ends of the operation rods 330a are pivotably connected to the bed. In the parallel link mechanism 310b, when the operation rods 330a are extended or contracted (as shown by arrows S) and/or rotated (as shown by arrows R) about pivots D provided on the bed, the pivot portion P of the movable body 320 is moved. By this movement, the movable body 320 can be translated along the X-axis direction and rotated about the pivot J on the pedestal 322. For effecting extension and contraction, each of the operation rods 330a includes two cylindrical members assembled in a telescopic fashion. By use of a feed screw driven by, for example, a servomotor, one of the cylindrical members is moved relative to the other cylindrical member to thereby increase or decrease the overall length of the operation rod 330a. Further, servomotors or like drive units are provided in order to rotate the operation rods 330a with respect to the bed.

In the above-described second embodiment and its modifications, the movable body 320 is supported on the bed via the pedestal 322 for translation along a single axis and rotation about a vertical axis. However, the mechanism for supporting the movable body 320 is not limited thereto, and may be modified in such a manner that a shaft portion is provided at the bottom of the movable body 320 and is slidably fitted into a straight groove formed on the bed, whereby the movable body 320 is directly supported on the bed for straight translation and rotation.

Although the left-hand and right-hand operation rods 330 (330a) may be pivotably connected to different portions of the movable body 320, in the above-described second embodiment and its modifications, the left-hand and right-hand operation rods-330 (330a) are connected to the single pivot point P provided at the back of the movable body 320. In such an embodiment, displacement of the movable body 320 can controlled accurately through control of movement of the single pivot point P effected by the two operation rods 330 (330a). Therefore, control in relation to displacement of the movable body 320 can be simplified.

Drive units for operating the operation rods 330 (330a) may be driven by use of a numerical controller such as a CNC controller. In such a case, preferably, a detection unit is provided for accurately detecting the position of the movable body 320 on the basis of the position of the pedestal 322 relative to the guide rail 321 and the rotational angle of the movable body 320 relative to the pedestal 322 detected by use of, for example, encoders; and the movement of the movable body 320 is controlled on the basis of the position detected by the detection unit. Even in the case in which the drive units for operating the operation rods 330 (330a) are driven by use of a numerical controller, in some cases, the movable body 320 cannot be displaced accurately, because of dimensional errors of the operation rods 330 (330a) or other factors. In such a case, the accurate position information of the movable body 320 detected by use of the detection unit is used to correct positional errors stemming from the dimensional errors of the operation rods 330 (330a) or to perform feedback control, to thereby enable accurate control of the drive units for the operation rods 330 (330a) for more accurate displacement of the movable body 320. Notably, no limitation is imposed on the detection unit. Although not illustrated, a detection mechanism including a movable detection block and a detection rod may be employed. Specifically, a first end of the detection rod is pivotably connected to the movable body 320, and a second end of the detection rode is pivotably connected to the movable detection block, which is slidably supported on the bed. The position of the second end of the detection rod, and the angles which the detection rod forms relative to the movable body and the movable detection block are detected by use of, for example, encoders and are used to determine the position of the pivot P of the movable body 320 for accurate detection of the position of the movable body 320.

Third Embodiment

Figure 14:
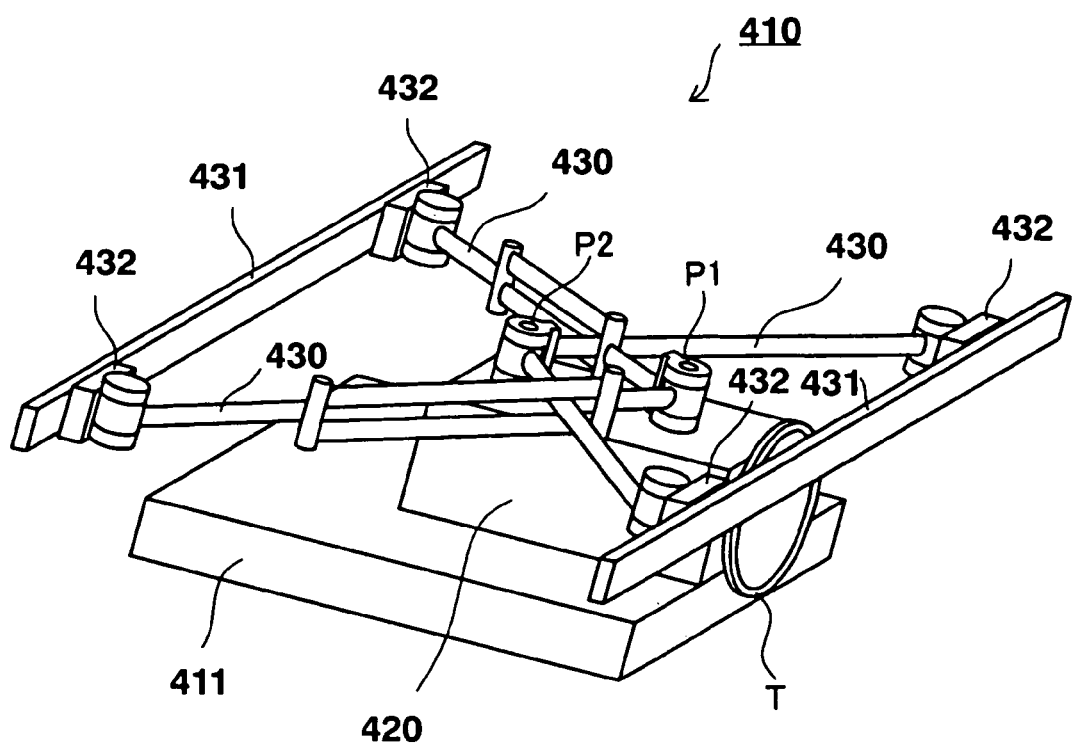
FIG. 14 is a perspective view of a parallel link mechanism according to a third embodiment of the invention.

FIG. 14 shows a parallel link mechanism 410 according to a third embodiment of the present invention.

The parallel link mechanism 410 includes a slide support 411 fixed to an unillustrated bed (base) of a cylindrical grinder; a movable body (wheel head) 420 slidably disposed on the top surface of the slide support 411; a pair of rails 431 fixedly disposed on the bed to be located on the front and rear sides of the movable body 420, respectively and to extend parallel to the Z-axis direction; i.e., along the rotational axis Ws of the workpiece W; two drive blocks 432 slidably supported by the rear rail 431; two drive blocks 432 slidably supported by the front rail 431; a pair of operation rods 430 whose first ends are pivotably connected to a first pivot P1 provided at the center of the movable body 420 and whose second ends are pivotably connected to the corresponding drive blocks 432 supported on the rear rail 431; and a pair of operation rods 430 whose first ends are pivotably connected to a second pivot P2 provided at the rear end of the movable body 420 and whose second ends are pivotably connected to the corresponding drive blocks 432 supported on the front rail 431. Notably, the slide support 411, which supports the weight of the movable body 420, may have a slant top surface that slants downward toward the front side. This configuration reduces the size of the cylindrical grinder as measured along the front-back direction, to thereby reduce the overall size of the cylindrical grinder.

Figure 15:
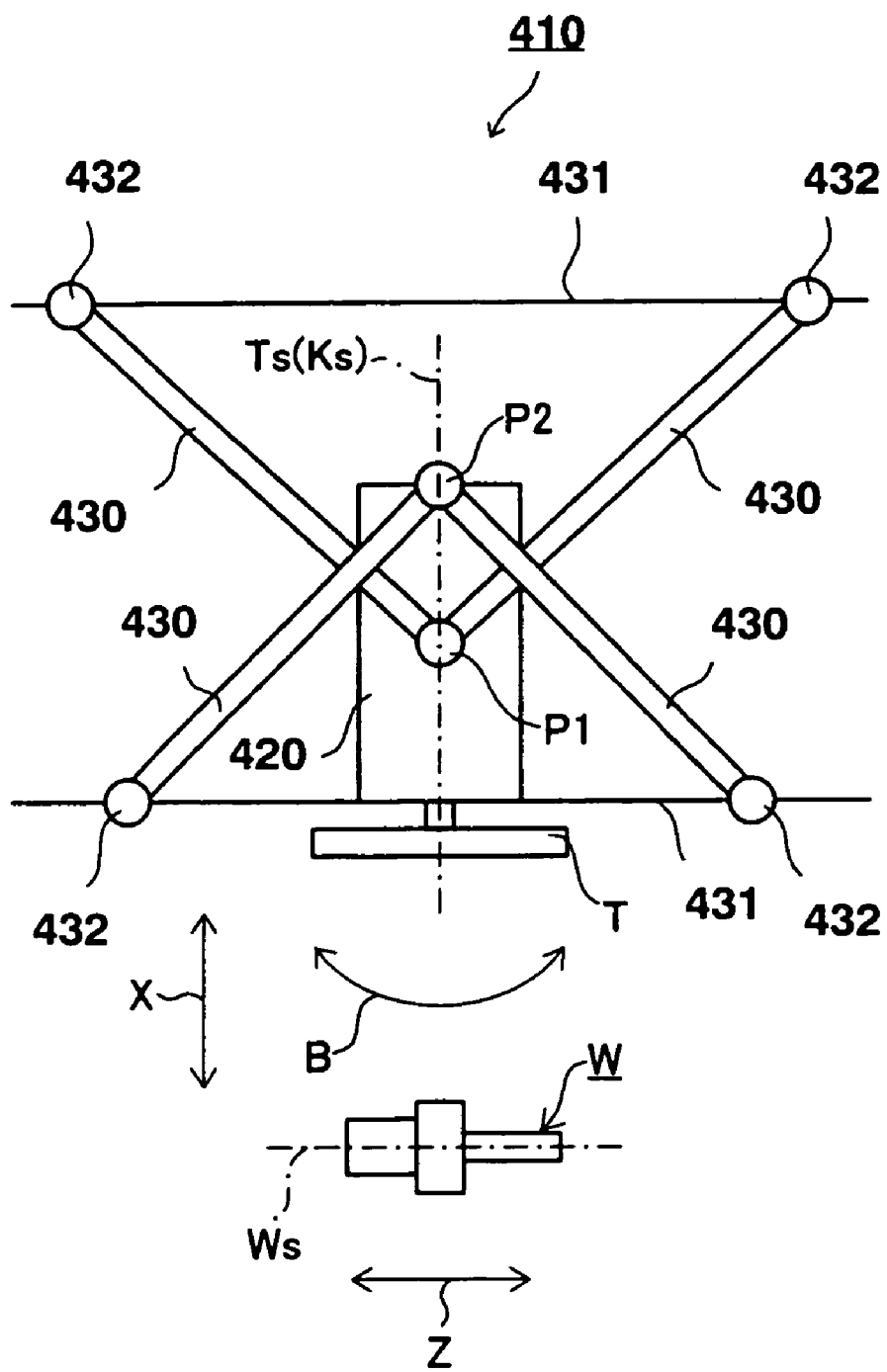
FIG. 15 is a plan view of the parallel link mechanism of FIG. 14.

The left-hand and right-hand operation rods (hereinafter referred to as the "rear operation rods") 430—which are pivotably connected to the left-hand and right-hand drive blocks (hereinafter referred to as the "rear drive blocks") 432 slidably supported on the rear rail 431—extend rearward from the pivot P1 provided at the center of the movable body 420. The left-hand and right-hand operation rods (hereinafter referred to as the "front operation rods") 430—which are pivotably connected to the left-hand and right-hand drive blocks (hereinafter referred to as the "front drive blocks") 432 slidably supported on the front rail 431—extend frontward from the pivot P2 provided at the rear end of the movable body 420. Notably, as shown in FIG. 15, the left-hand and right-hand rear operation rods 430 and the left-hand and right-hand front operation rods 430 are disposed symmetrically with respect to the reference plane Ks perpendicular to the rotational axis Ws of the workpiece W. In the present embodiment, the pivot P1 for the left-hand and right-hand rear operation rods 430 is provided on the rotational axis Ts of the grinding wheel T; and the left-hand and right-hand rear operation rods 430 are disposed symmetrically with respect to the rotational axis Ts. Similarly, the pivot P2 for the left-hand and right-hand front operation rods 430 is provided on the rotational axis Ts of the grinding wheel T; and the left-hand and right-hand front operation rods 430 are disposed symmetrically with respect to the rotational axis Ts. This configuration enables the rear and front operation rods 430 to equally sustain, in a distributed manner, stresses acting on the movable body 420 in the X-axis direction; i.e., a direction perpendicular to the rotational axis Ws of the workpiece W.

Further, the rear operation rods 430 extending rearward from the pivot P1 and the front operation rods extending frontward from the pivot P2 intersect each other. This configuration shortens the lengths of portions of the front and rear operation rods 430 extending from the movable body 420, to thereby reduce the overall size of the parallel link mechanisms 410.

The drive blocks 432 slidably supported by the front and rear rails 431 are moved independently along the corresponding rails 431 by means of drive units each employing a feed screw driven by a servomotor, or by means of drive units each employing a linear motor. When the drive blocks 432 are moved, the movements of the drive blocks 432 are transmitted to the pivots P1 and P2 of the movable body 420 via the corresponding operation rods 430, whereby the movable body 420 is translated and rotated relative to the bed.

Next, operation of the parallel link mechanism 410 will be described. FIG. 15 shows a state in which the movable body 420 has been positioned with respect to the workpiece W in such a manner that the rotational axis Ts of the grinding wheel T is located in the reference plane Ks perpendicular to the rotational axis Ws of the workpiece W. When the drive blocks 432 are moved individually from the respective positions shown in FIG. 15 to thereby move the corresponding operation rods 430, the movable body 420 is translated along the X-axis and Z-axis directions, or rotated along direction B in such a manner that the rotational axis Ts of the grinding wheel T is tilted leftward or rightward from the reference plane Ks. Thus, the movable body 420 can assume various positional relationships with respect to the workpiece W.

Figure 16:
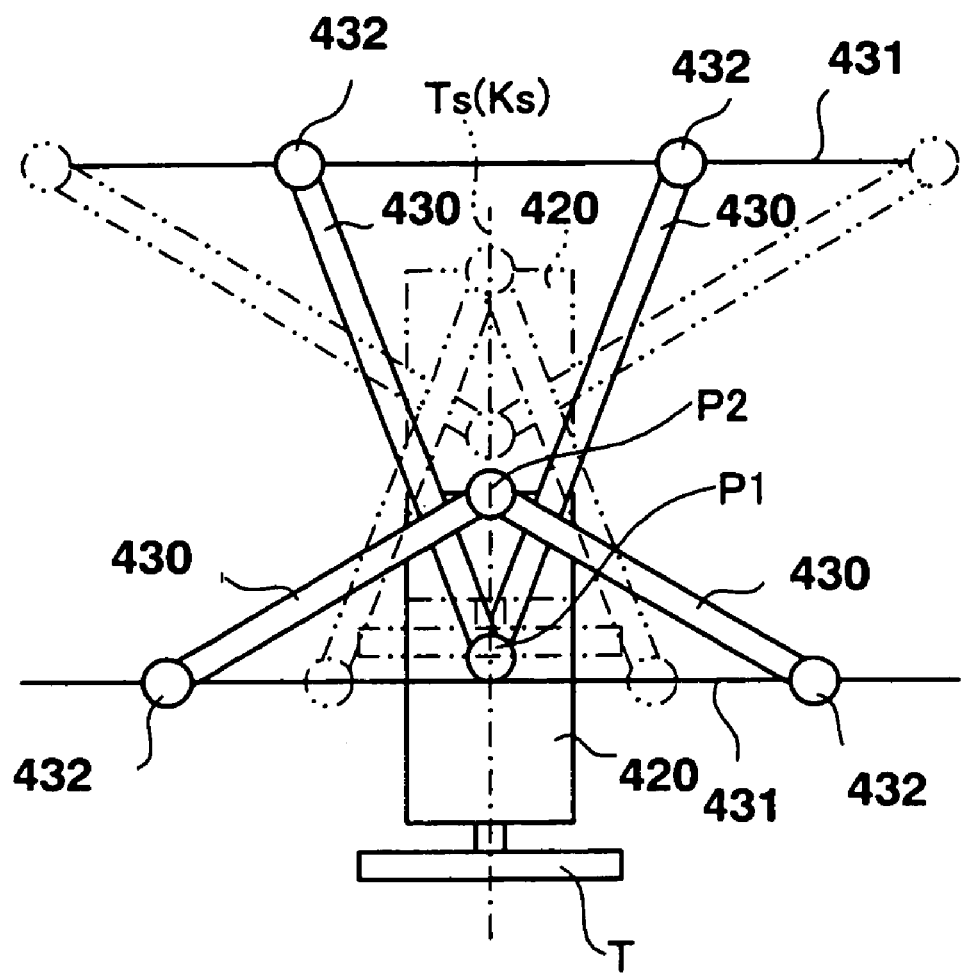
FIG. 16 is a plan view showing an operated state of the parallel link mechanism of FIG. 14.

When the left-hand and right-hand rear drive blocks 432 are moved in opposite directions by equal distances from the positions shown in FIG. 15 and the left-hand and right-hand front drive blocks 432 are moved in opposite directions by equal distances from the positions shown in FIG. 15, the pivots P1 and P2 of the movable body 420 are moved along the X-axis direction. As a result, as shown in FIG. 16, the movable body 420 translates straight along the X-axis direction without rotating; i.e., translates while maintaining the state in which the rotational axis Ts of the grinding wheel T is located in the reference plane Ks. In FIG. 16, solid lines illustrate a state in which the movable body 420 has been translated frontward along the X-axis direction through simultaneous operation of closing the left-hand and right-hand rear operation rods 430 and opening the left-hand and right-hand front operation rods 430; and double-dot chain lines illustrate a state in which the movable body 420 has been translated rearward along the X-axis direction through simultaneous operation of opening the left-hand and right-hand rear operation rods 430 and closing the left-hand and right-hand front operation rods 430.

Figure 17:
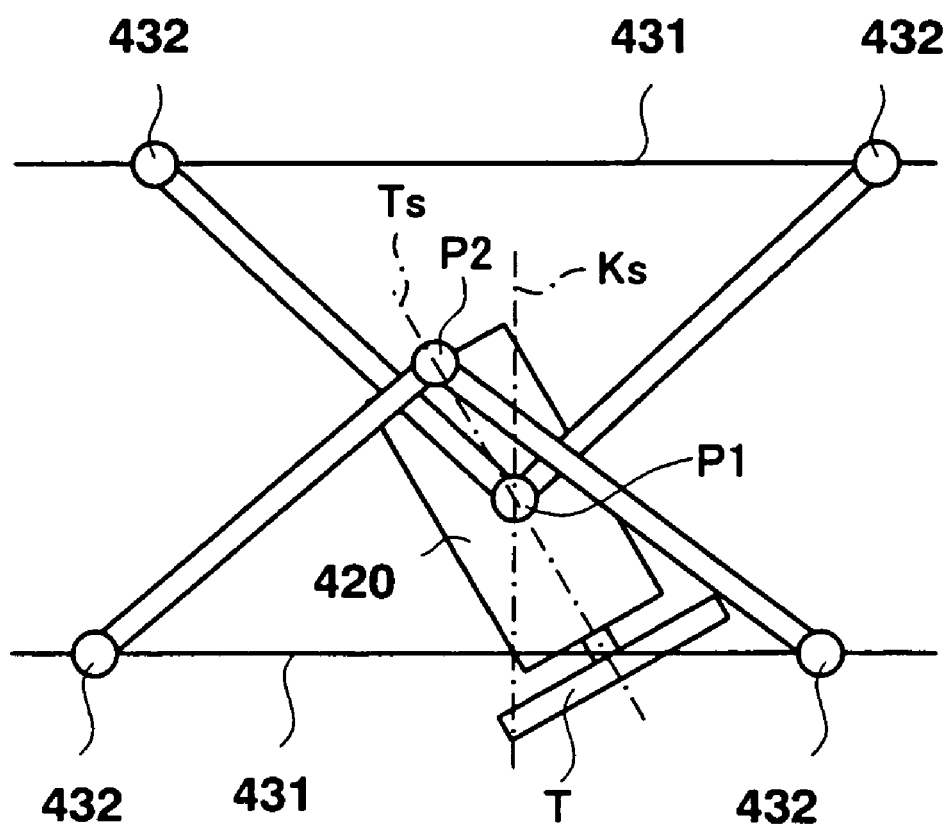
FIG. 17 is a plan view showing another operated state of the parallel link mechanism of FIG. 14.

In contrast, when, as shown in FIG. 17, the rear drive blocks 432 and the front drive blocks 432 are moved individually by different distances, the movable body 420 is turned, whereby the rotational axis Ts of the grinding wheel T is tilted from the reference plane Ks. Notably, FIG. 17 shows a state in which the rotational axis Ts of the grinding wheel T has been tilted rightward from the reference plane Ks, and thus, a left-hand portion of the grinding wheel T is positioned forward relative to the center of the grinding wheel T in order to grind the workpiece W. More specifically, an outer circumferential surface and an end surface of the workpiece W are ground by use of corners of the left-hand portion of the grinding wheel T.

In the parallel link mechanism of the present embodiment, the pivot P1 for the rear operation rods 430 serves as a point for determining translation distances of the movable body 420 along the X-axis and Z-axis directions; and the pivot P2 for the front operation rods 430 serves as a point for determining a rotation amount of the movable body 420 along direction B. Therefore, the movable body 420 is rotated about the pivot P1 by means of the front operation rods 430. However, the parallel link mechanism of the present embodiment is not limited thereto. Alternatively, the pivot P2 may be used as a point for determining translation distances of the movable body 420, and the pivot P1 may be used as a point for determining a rotation angle of the movable body 420. Further alternatively, an imaginary pivot point may be set on a line passing through the pivots P1 and P2, and the movable body 420 may be rotated about the imaginary pivot point.

Figure 18:
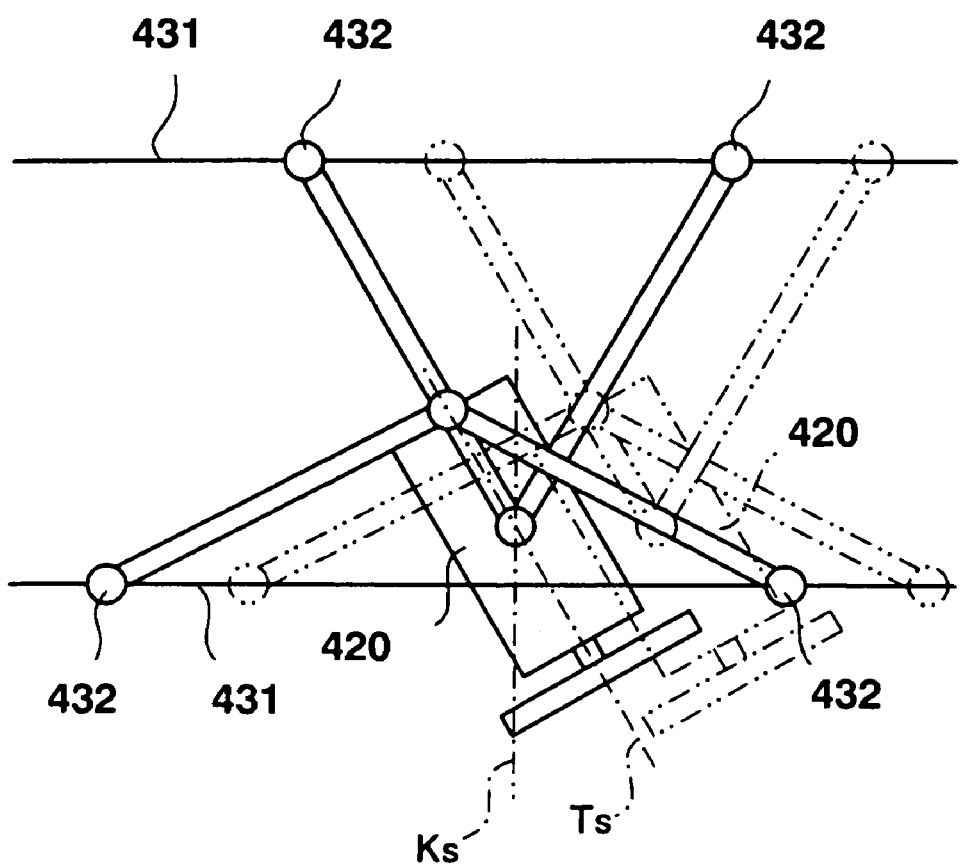
FIG. 18 is a plan view showing still another operated state of the parallel link mechanism of FIG. 14.

Even when the movable body 420 is in a tilted state, the movable body 420 can be translated along the X-axis direction, as indicated by solid lines in FIG. 18, through an operation of simultaneously moving the left-hand and right-hand rear drive blocks 432 in opposite directions by equal distances and the left-hand and right-hand front drive blocks 432 in opposite directions by equal distances. Moreover, as indicated by double-dot chain lines in FIG. 18, the movable body 420 can be translated along the Z-axis direction, while its tilt angle is maintained, through an operation of simultaneously moving all the drive blocks 432 in the same directions by equal distances.

In the above-described embodiment, the left-hand and right-hand rear operation rods 430 and the left-hand and right-hand front operation rods 430 are moved upon movement of the drive blocks 432. However, the movable body 420 can be displaced by use of three operation rods 430. Therefore, one arbitrary operation rod 430 may be used as a detection rod that constitutes detection means (not shown) for detecting the actual displacement of the movable body 420. In such a case, one drive block 432 corresponding to the operation rod 430 serving as a detection rod is not moved and serves as a movable detection block which is slidably supported on the corresponding rail and is moved in accordance with displacement of the movable body 420. A translation distance of the movable detection block, and angles which the detection rod forms relative to the movable body and the movable detection block are detected by use of, for example, encoders and are used to determine the actual displacement of the movable body 320. Use of data representing the displacement enables more accurate displacement of the movable body 320. Even in the case where the drive blocks 432 corresponding to three operation rods 430 are driven by use of a numerical controller such as a CNC controller, in some cases, the movable body 420 cannot be displaced to a desired position, because of dimensional errors of the operation rods 430 or other factors. In such a case, data representing the actual displacement detected by use of the above-described detection means are used to correct positional errors stemming from the dimensional errors of the operation rods 430 or to perform feedback control, to thereby enable accurate drive of the drive blocks 432. Thus, the movable body 420 can be displaced to a desired position with high accuracy.

In the above-described embodiment, a rail extending along the Z-axis direction is disposed on each of the front and rear sides of the movable body; and the drive blocks are translated along the Z-axis direction on the corresponding rails. The arrangement of the rails is not limited thereto. Alternatively, a rail extending along the X-axis direction may be disposed on each of the left and right sides of the movable body; and the drive blocks translated along the X-axis direction on the corresponding rails. Further alternatively, four slant rails may be disposed radially with respect to the movable body; and drive blocks moved on the rails along respective directions intersecting the Z-axis and X-axis directions. Notably, when the strokes of movement of the drive blocks relative to the bed are increased, the stroke of movement of the movable body along the direction of movement of the drive blocks can be increased. Therefore, when the parallel link mechanism is configured to translate the drive blocks along the Z-axis direction, the stroke of movement of the movable body along the Z-axis direction can be increased easily; and when the parallel link mechanism is configured to translate the drive blocks along the X-axis direction, the stroke of movement of the movable body along the X-axis direction can be increased easily.

Obviously, numerous modifications and variations of the present invention are possible in light of the above teachings. It is therefore to be understood that within the scope of the appended claims, the present invention may be practiced otherwise than as specifically described herein.

What is claimed is:

1. A link mechanism for producing relative movement between a grinding wheel and a workpiece in a cylindrical grinder, comprising: a movable body supporting one of the grinding wheel and the workpiece, the movable body being disposed on a base of the cylindrical grinder to be translatable along a first axis and rotatable about a second axis perpendicular to the first axis; and at least two operation rods pivotably connected to a pivot portion of the movable body, the operation rods moving the pivot portion in order to translate and rotate the movable body relative to the base.

2. A link mechanism according to claim 1, further comprising two drive blocks disposed on the base and moved straight, the operation rods being pivotally connected to the respective drive blocks.

3. A link mechanism according to claim 2, wherein the drive blocks are moved along a direction parallel to a translation direction of the movable body.

4. A link mechanism according to claim 2, wherein the drive blocks are moved along a direction perpendicular to a translation direction of the movable body.

5. A link mechanism according to claim 1, wherein the operation rods are pivotably connected to the base and configured to be extendable and contractable; and the operation rods are extended or contracted or rotated relative to the base in order to move the pivot portion of the movable body.

6. A link mechanism for producing relative movement between a grinding wheel and a workpiece in a cylindrical grinder, comprising: a movable body movably disposed on a base of the cylindrical grinder and supporting one of the grinding wheel and the workpiece; at least three drive blocks each moved straight relative to the base; and at least three operation rods, first ends of the operation rods being pivotably connected to the movable body via at least two pivot portions, and second ends of the operation rods being pivotally connected to the corresponding drive blocks, wherein the movable member is translated or rotated, on a plane, relative to the base upon transmission of movements of the drive blocks to the movable body via the operation rods and the pivot portions.

7. A link mechanism according to claim 6, further comprising detection means for detecting actual displacement of the movable body relative to the base.

8. A parallel link mechanism according to claim 6, wherein, of the operation rods, at least two operation rods are disposed symmetrically on opposite sides of a reference line along which the grinding wheel and the workpiece are disposed to face each other.

9. A link mechanism according to claim 6, wherein, of the operation rods, at least two operation rods intersect each other.

10. A link mechanism according to claim 6, further comprising a support member for supporting the movable body in such a manner that the movable body can translate and rotate on a plane defined on the base.

\* \* \* \* \*